US012669605B2

(12) United States Patent
Husain

(10) Patent No.: US 12,669,605 B2
(45) Date of Patent: Jun. 30, 2026

(54) MACHINE-LEARNING AUGMENTED SYNTHETIC APERTURE SONAR

(71) Applicant: SparkCognition, Inc., Austin, TX (US)

(72) Inventor: Syed Mohammad Amir Husain, Georgetown, TX (US)

(73) Assignee: AVATHON, INC., Austin, TX (US)

( * ) Notice: Subject to any disclaimer, the term of this patent is extended or adjusted under 35 U.S.C. 154(b) by 842 days.

(21) Appl. No.: 17/468,135

(22) Filed: Sep. 7, 2021

(65) Prior Publication Data

US 2022/0075061 A1 Mar. 10, 2022

Related U.S. Application Data

(60) Provisional application No. 63/076,011, filed on Sep. 9, 2020.

(51) Int. Cl.
| | |
|---|---|
| *G01S 15/89* | (2006.01) |
| *G01S 7/52* | (2006.01) |
| *G01S 7/526* | (2006.01) |
| *G06N 20/00* | (2019.01) |

(52) U.S. Cl.
CPC ...... *G01S 15/8997* (2013.01); *G01S 7/52004* (2013.01); *G01S 7/526* (2013.01); *G06N 20/00* (2019.01)

(58) Field of Classification Search
CPC .. G01S 15/8997; G01S 7/52004; G01S 7/526; G06N 20/00
See application file for complete search history.

(56) References Cited

U.S. PATENT DOCUMENTS

| | | | | |
|---|---|---|---|---|
| 8,879,357 | B2 * | 11/2014 | Rikoski | G05D 1/0692 |
| | | | | 367/88 |
| 10,065,718 | B1 * | 9/2018 | Husain | F42B 19/00 |
| 11,043,026 | B1 * | 6/2021 | Fathi | G06N 20/00 |
| 2018/0167452 | A1 * | 6/2018 | Yucelen | H04L 67/104 |
| 2019/0033447 | A1 * | 1/2019 | Chan | G06V 10/82 |
| 2020/0134491 | A1 * | 4/2020 | Cruise | G06N 3/006 |
| 2020/0150253 | A1 * | 5/2020 | Chinnan | G06N 3/045 |

(Continued)

OTHER PUBLICATIONS

Petritoli et al., "Simulation of Autonomous Underwater Vehicles (AUVs) Swarm Diffusion", Sensors 2020, 20, 4950 (2020) (Year: 2020).*

(Continued)

*Primary Examiner* — Yuqing Xiao
*Assistant Examiner* — Christopher Richard Walker
(74) *Attorney, Agent, or Firm* — Moore IP Law

(57) ABSTRACT

An autonomous underwater device includes one or more receiver arrays. Each receiver array includes a plurality of receiver elements, and each receiver element is configured to generate a signal responsive to detecting sound energy in an aquatic environment. The autonomous underwater device also includes one or more processors coupled to the one or more receiver arrays and configured to receive signals from the receiver elements, to generate input data based on the received signals, and to provide the input data to an on-board machine learning model to generate model output data. The model output data includes sonar image data based on the sound energy, a label associated with the sonar image data, or both.

29 Claims, 8 Drawing Sheets

(56)                    References Cited

U.S. PATENT DOCUMENTS

| | | | |
|---|---|---|---|
| 2021/0306248 A1* | 9/2021 | DeWeert | ................. H04L 43/50 |
| 2022/0178690 A1* | 6/2022 | Wallace | ................. G01C 15/00 |

OTHER PUBLICATIONS

Behrje et al., "A Robust Acoustic-Based Communication Principle for the Navigation of an Underwater Robot Swarm", 2018 Oceans-MTS/IEEE Kobe Techno-Oceans (OTO), 2018, pp. 1-5 (Year: 2018).*

Dell'Erba, "Determination of Spatial Configuration of an Underwater Swarm with Minimum Data", Int J Adv Robot Syst, vol. 12, 2015 (Year: 2015).*

Allison, "A Resilient Cooperative Localization Strategy for Autonomous Underwater Vehicles in Swarms", 2020 10th Annual Computing and Communication Workshop and Conference (CCWC), Las Vegas, NV, USA, 2020, pp. 0150-0156 (Year: 2020).*

Martins et al. ("Coordinated maneuver for gradient search using multiple AUVs," Oceans 2003. Celebrating the Past . . . Teaming Toward the Future (IEEE Cat. No.03CH37492), San Diego, CA, USA, 2003, pp. 347-352 vol. 1) (Year: 2003).*

"High Speed, High Resolution Seabed Mapping Using Commercial Interferometric Synthetic Aperture Sonar," Vimeo, https://vimeo.com/216753773, retrieved Jul. 27, 2020, 1 pg.

Barclay, Philip J., "Interferometric Synthetic Aperture Sonar Design and Performance," A thesis presented for the degree of Doctor of Philosophy in Electrical and Computer Engineering at the University of Canterbury, Christchurch, New Zealand, Aug. 2006, pp. 1-203.

Callow, Hayden J., "Signal Processing for Synthetic Aperture Sonar Image Enhancement," A thesis presented for the degree of Doctor of Philosophy in Electrical and Electronic Engineering at the University of Canterbury, Christchurch, New Zealand, Apr. 2003, pp. 1-273.

George, Jibin, et al., "A Review of Advances in Synthetic Aperture Sonar Imaging Algorithms," International Journal of Innovative Research in Electrical, Electronics, Instrumentation and Control Engineering, LBS College of Engineering, Kasaragod, vol. 3, Special Issue 1, Feb. 2016, DOI 10.17148/IJIREEICE, pp. 136-139.

Gerg, Isaac D., et al., "GPU Acceleration for Synthetic Aperture Sonar Image Reconstruction," arXiv:2101.05888v2 [eess.SP] May 26, 2021, pp. 1-9.

Hagen, Per Espen et al., "Interferometric Synthetic Aperture Sonar for AUV Based Mine Hunting: The SensoTek project," Unmanned Systems, Baltimore MD, Jul.-Aug. 2021, pp. 1-8.

Hansen, Roy Edgar, "Introduction to Synthetic Aperture Sonar," Sonar Systems, ISBN: 978-953-307-345-3, www.intechopen.com, pp. 1-28.

Manaranche, Martin, "France to Order Four Unmanned System for Mine Warfare This Year," https://www.navalnews.com/naval-news/2020/06/france-to-order-four-unmanned-systems-for-mine-warfare-this-year/, Jun. 2, 2020, pp. 1-5.

Spagnolo, Giuseppe S. et al., "Underwater Optical Wireless Communications: Overview," Sensors, 2020, vol. 20, 2261, www.mdpi.com/journal/sensors, doi:10.3390/s20082261, pp. 1-14.

Zhou, Jianhu, et al., "Reconstructing Seabed Topography from Side-Scan Sonar Images with Self-Constraint," Remote Sensing, 2018, vol. 10, 201, www.mdpi.com/journal/remotesensing, doi:10.3390/rs10020201, pp. 1-21.

* cited by examiner

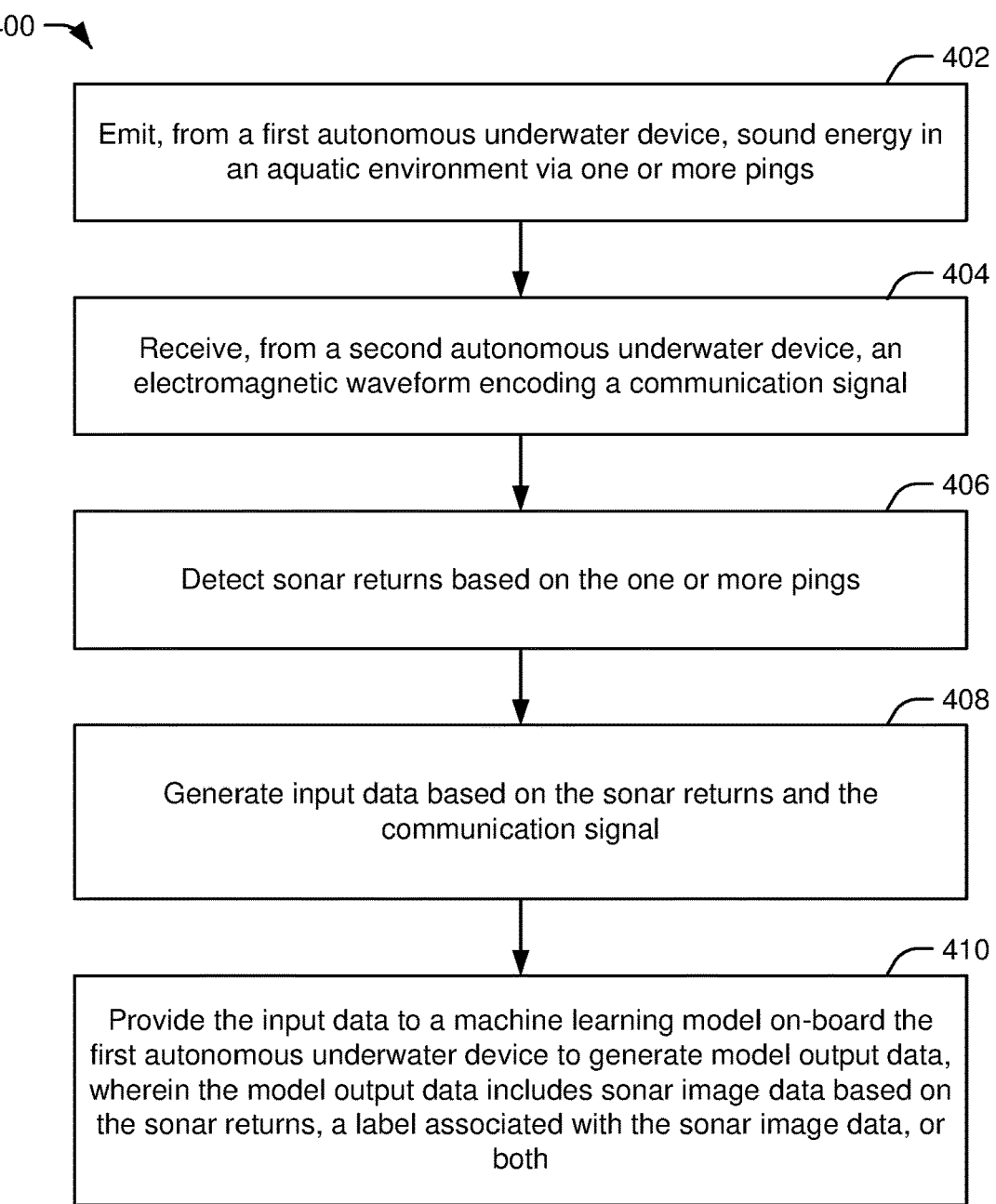

400

402

Emit, from a first autonomous underwater device, sound energy in an aquatic environment via one or more pings

404

Receive, from a second autonomous underwater device, an electromagnetic waveform encoding a communication signal

406

Detect sonar returns based on the one or more pings

408

Generate input data based on the sonar returns and the communication signal

410

Provide the input data to a machine learning model on-board the first autonomous underwater device to generate model output data, wherein the model output data includes sonar image data based on the sonar returns, a label associated with the sonar image data, or both

*FIG. 4*

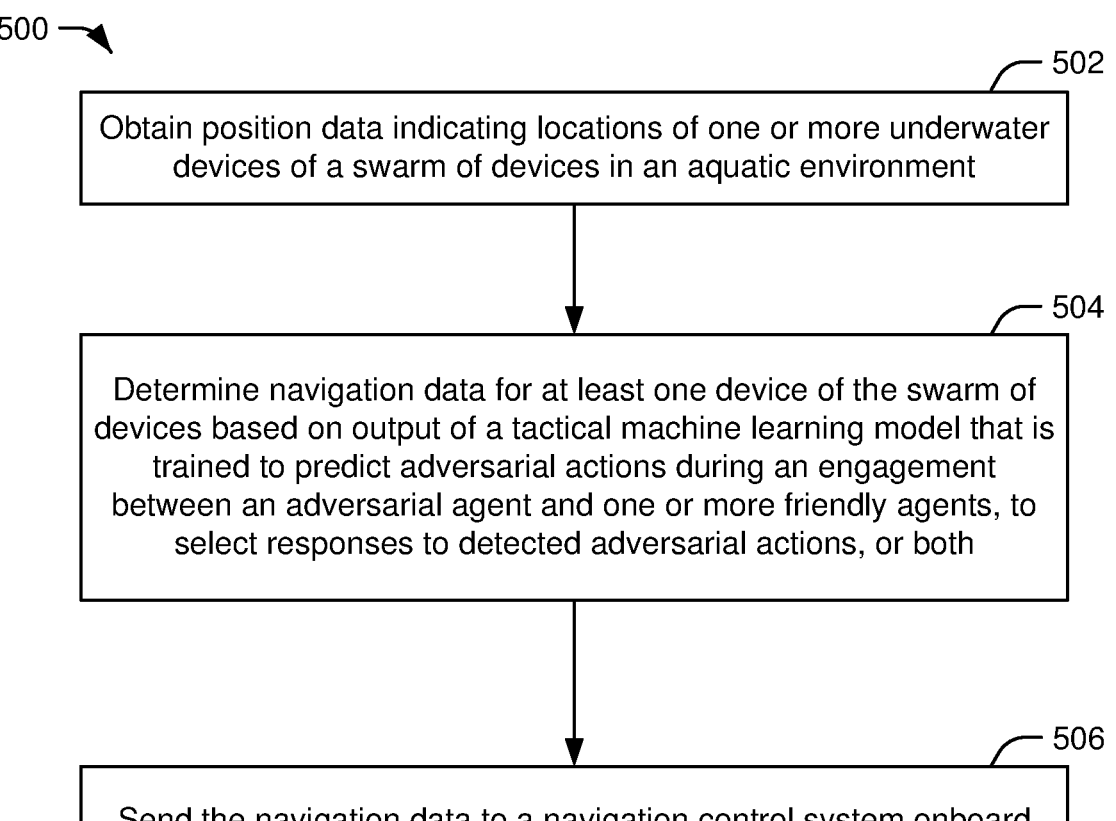

500

502
Obtain position data indicating locations of one or more underwater devices of a swarm of devices in an aquatic environment 504
Determine navigation data for at least one device of the swarm of devices based on output of a tactical machine learning model that is trained to predict adversarial actions during an engagement between an adversarial agent and one or more friendly agents, to select responses to detected adversarial actions, or both 506
Send the navigation data to a navigation control system onboard the at least one device to cause the at least one device to, in cooperation with one or more other devices of the swarm of device, gather synthetic aperture sonar data in a particular area

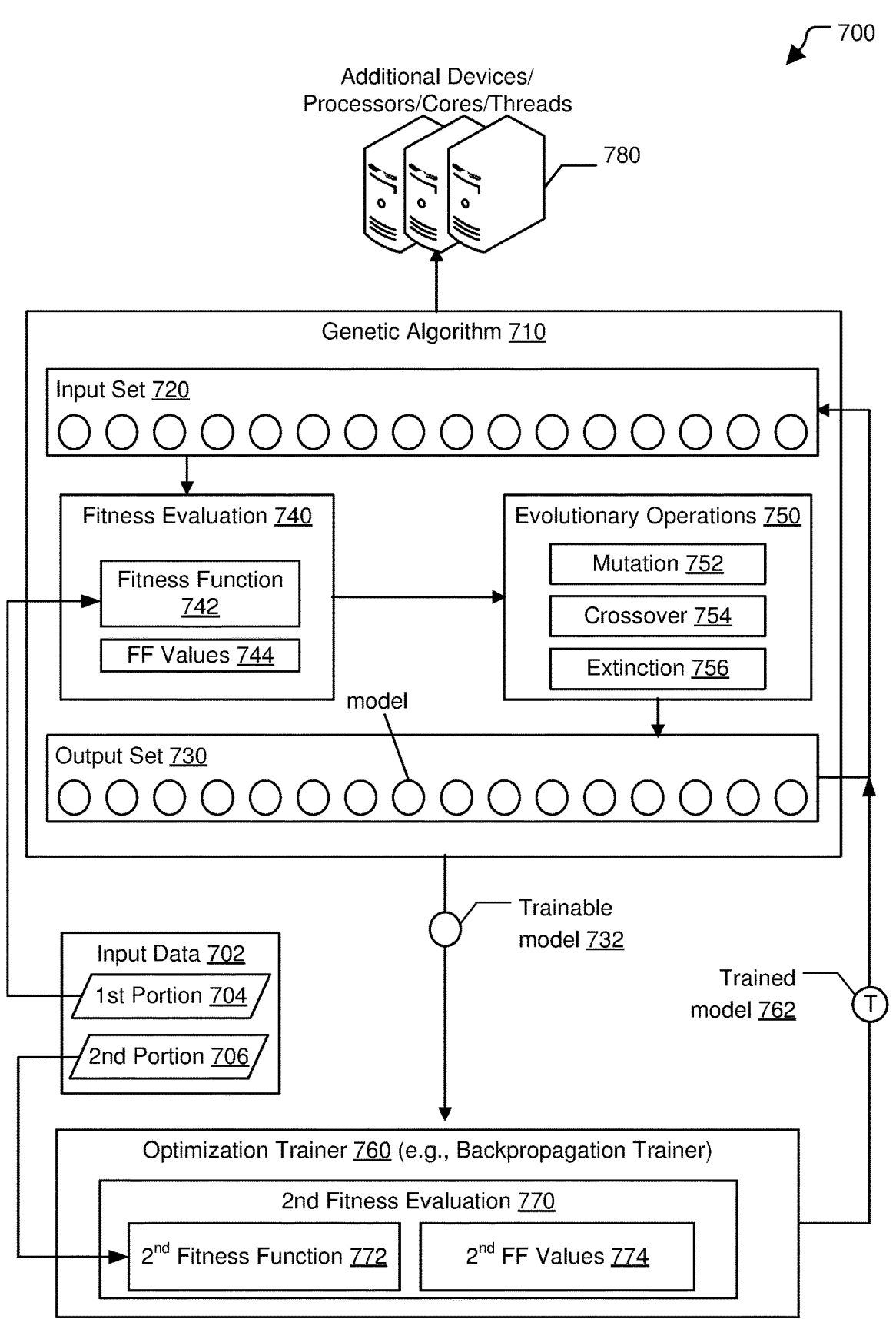

Additional Devices/
Processors/Cores/Threads

780

Genetic Algorithm 710

Input Set 720

○ ○ ○ ○ ○ ○ ○ ○ ○ ○ ○ ○ ○ ○ ○ ○

Fitness Evaluation 740

Fitness Function
742

FF Values 744

Evolutionary Operations 750

Mutation 752

Crossover 754

Extinction 756 model

Output Set 730

○ ○ ○ ○ ○ ○ ○ ○ ○ ○ ○ ○ ○ ○ ○ ○

Trainable
model 732

Trained
model 762

T

Input Data 702

1st Portion 704

2nd Portion 706

Optimization Trainer 760 (e.g., Backpropagation Trainer)

2nd Fitness Evaluation 770

2nd Fitness Function 772        2nd FF Values 774

FIG. 7

MACHINE-LEARNING AUGMENTED SYNTHETIC APERTURE SONAR

CROSS-REFERENCE TO RELATED APPLICATION

The present application claims priority from U.S. Provisional Application No. 63/076,011 filed Sep. 9, 2020, entitled "MACHINE-LEARNING AUGMENTED SYNTHETIC APERTURE SONAR," which is incorporated by reference herein in its entirety.

BACKGROUND

Synthetic aperture sonar (SAS) is a technique to generate high accuracy sonar images based on moving a side scanning sonar device while emitting pings and receiving returns. Various signal processing techniques are used to process the returns to generate a final sonar image or set of images. Conventional signal processing techniques used to generate the final sonar image(s) use a great deal of memory and processor resources.

SUMMARY

The present disclosure describes applications of machine learning to augment capturing and/or processing synthetic aperture sonar data.

A particular aspect of the disclosure describes an autonomous underwater device that includes one or more receiver arrays and one or more processors coupled to the one or more receiver arrays. Each of the one or more receiver arrays includes a plurality of receiver elements, and each receiver element is configured to generate a signal responsive to detecting sound energy in an aquatic environment. The one or more processors are configured to receive signals from the receiver elements, to generate input data based on the received signals, and to provide the input data to an on-board machine learning model to generate model output data. The model output data includes sonar image data based on the sound energy, a label associated with the sonar image data, or both.

A particular aspect of the disclosure describes a system including a plurality of autonomous underwater devices configured to operate cooperatively as a swarm. The plurality of autonomous underwater devices include a first autonomous underwater device and a second autonomous underwater device. The first autonomous underwater device includes a propulsion system configured to propel the first autonomous underwater device within an aquatic environment. The first autonomous underwater device also includes one or more receiver arrays. Each receiver array includes a plurality of receiver elements, and each receiver element is configured to generate a signal responsive to detecting sound energy in the aquatic environment. The first autonomous underwater device further includes one or more processors coupled to the one or more receiver arrays. The one or more processors are configured to receive signals from the receiver elements, to generate input data based on the received signals, and to provide the input data to a machine learning model associated with the swarm to generate model output data. The model output data includes sonar image data based on the sound energy, a label associated with the sonar image data, or both. The second autonomous underwater device includes one or more sonar transducers configured to emit one or more pings into the aquatic environment.

Another aspect of the disclosure describes a method that includes emitting, from a first autonomous underwater device, sound energy in an aquatic environment via one or more pings. The method also includes receiving, at the first autonomous underwater device from a second autonomous underwater device, an electromagnetic waveform encoding a communication signal. The method further includes detecting, at the first autonomous underwater device, sonar returns based on the one or more pings. The method also includes generating input data based on the sonar returns and the communication signal and providing the input data to a machine learning model on-board the first autonomous underwater device to generate model output data. The model output data includes sonar image data based on the sonar returns, a label associated with the sonar image data, or both.

Another aspect of the disclosure describes a method that includes obtaining position data indicating locations of one or more underwater devices of a swarm of devices in an aquatic environment. The method also includes determining navigation data for at least one device of the swarm of devices based on output of a tactical machine learning model that is trained to predict adversarial actions during an engagement between an adversarial agent and one or more friendly agents, to select responses to detected adversarial actions, or both. The method further includes sending the navigation data to a navigation control system onboard the at least one device to cause the at least one device to, in cooperation with one or more other devices of the swarm of device, gather synthetic aperture sonar data in a particular area.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 4 is a flow chart of a particular method of processing data generated by one or more synthetic aperture sonar system using machine learning.

FIG. 5 is a flow chart of another particular method of processing data generated by one or more synthetic aperture sonar system using machine learning.

FIG. 7 is a diagram illustrating details of one example of the automated model builder instructions to generate a machine-learning instructions used by the system of FIG. 1 or FIG. 2.

DETAILED DESCRIPTION

Figure 1:
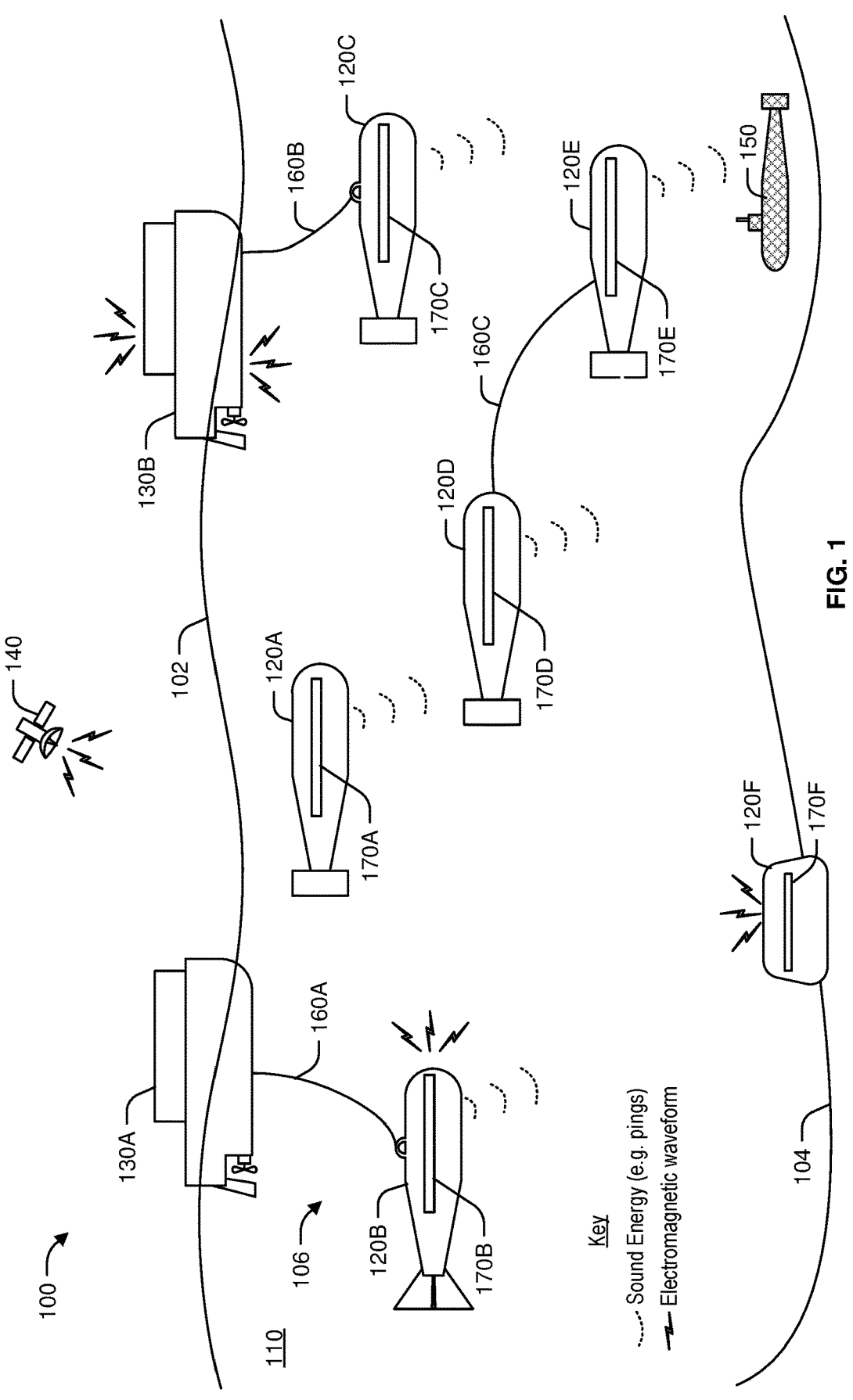
FIG. 1 is a diagram of a system that includes a swarm of devices operating cooperatively to generate synthetic aperture sonar image data in an underwater environment.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, autonomous underwater devices are illustrated and associated with reference numbers 120A, 120B, 120C, 120D, 120E, and 120F. When referring to a particular one of these autonomous underwater devices, such as the autonomous underwater devices 120A, the distinguishing letter "A" is used. However, when referring to any arbitrary one of these autonomous underwater devices or to these autonomous underwater devices as a group, the reference number 120 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, a "machine-learning" refers to a process by which software (e.g., instructions, parameters, or both) is generated via a training or optimization process, and a "machine-learning model" is the software (e.g., the instructions, the parameters, or both) so generated. In some implementations disclosed herein, automated model building is used to generate a machine-learning model. In common usage, performing machine-learning generally refers to training or optimizing a model after a model type and architecture as specified (often by a data scientist or other subject matter expert). As used herein, "automated model building" or "AMB" refers to an extension of such machine-learning to a situation in which the model type, the model architecture, or both, are not specified in advance. Thus, a computing device executing AMB software (also referred to as an "AMB engine") automatically selects one or more model types, one or more model architecture, or both, to generate a model (or models). The AMB engine may also train and test one or more models in order to generate a machine-learning model based on a set of input data and specified goals, such as an indication of one or more data fields of the input data that are to be modeled, limits on a type or architecture of the machine-learning model, a model building termination condition, etc.

As used herein, the term "autonomous" indicates that a device operates to select goals and perform actions toward achieving such selected goals without real-time or near-real time input from a human. Autonomous devices generally use a suite of software to enable autonomous action. For example, an autonomous device may execute structured programs (e.g., heuristics) to perform relatively simple actions, such as gathering data from sensors, performing some data processing operations, communicating with other devices, moving, interacting with environmental features, etc. Additionally, or in the alternative, an autonomous device may use one or more machine-learning model to perform more complex, resource intensive, or ambiguous operations, such as making decisions, detecting complex patterns in data (e.g., object detection), operating cooperatively with other devices, etc.

FIG. 1 is a diagram of a system 100 that includes a swarm 106 of devices operating cooperatively to generate synthetic aperture sonar image data in an aquatic environment 110. The aquatic environment 110 is bounded by a surface 102 and a floor 104. In the example illustrated in FIG. 1, the swarm 106 includes multiple autonomous underwater devices 120 (also referred to herein as "AUDs") and multiple surface vehicles 130. The AUDs 120 in the example illustrated in FIG. 1 include one or more stationary devices (such as AUD 120F), one or more self-propelled devices (such as AUDs 120A, 120C, 120D, and 120E), and one or more towable devices (such as AUD 120B). Thus, in the example illustrated in FIG. 1, some of the AUDs includes a propulsion system (e.g., are self-propelled), whereas others do not. In other examples, the swarm 106 includes more devices, fewer devices, different devices, different types of devices, or a combination thereof. To illustrate, in some implementations, all of the devices of the swarm 106 are self-propelled.

In the example illustrated in FIG. 1, the AUD 120B is coupled to and is towed by the surface vehicle 130A via a tether 160A. In contrast, the AUD 120C is coupled to and tows the surface vehicle 130B via a tether 160B. In some implementations, an AUD 120 is towed by a surface vehicle 130 at some times and tows the surface vehicle 130 at other times. In addition to providing a physical link between the surface vehicle 130 and the AUD 120, the tether 160 may provide a power and/or a communications link between the surface vehicle 130 and the AUD 120. For example, the surface vehicle 130B may receive data transmissions above the surface 102 (such as via radio frequency signals or other electromagnetic signals sent via a satellite 140, an aircraft, or another surface vehicle 130A) and may send information or commands based on the data transmissions to the AUD 120C. To illustrate, the surface vehicle 130B may receive position information, such as global position system data, from the satellite 140 and may provide information or commands based on the position information to the AUD 120C. Additionally, or alternatively, the AUD 120C may collect sonar image data or other data in the aquatic environment 110 and send the sonar image data or other data to the surface vehicle 130B via the tether 160B. In this example, the surface vehicle 130B may transmit information or commands based on the sonar image data or other data to other devices via data transmissions above the surface 102.

In FIG. 1, the AUD 120F is resting on the floor 104 of the aquatic environment 110. However, in other implementations, an AUD 120 remains stationary in a different manner. In this context, a "stationary" device refers to a devices that maintains its position within a margin of error. To illustrate, a device that is at anchor or performing station-keeping operations may move within a relatively small area due to currents, etc., but remains on station (e.g., stationary) within some defined margin of error.

FIG. 1 also illustrates an example of a suspected enemy device 150. In FIG. 1, the suspected enemy device 150 is illustrated as a submarine as one example. In other implementations, the suspected enemy device 150 includes a surface vehicle, another type of underwater vehicle, a deployable device (such as a buoy, a mine, a fence or net), or an infrastructure device (e.g., an undersea cable, a bridge footing, etc.).

In FIG. 1, each of the AUDs 120 includes a respective synthetic aperture sonar (SAS) system 170. Each of the SAS systems 170 is configured to emit sound energy into the aquatic environment 110, to detect sound energy in the aquatic environment 110, or both, to facilitate generation of SAS image data. One or more devices of the swarm 106 also includes a communications system configured to encode signals in an electromagnetic waveform, to decode signals received via an electromagnetic waveform, or both. The electromagnetic waveform(s) may be transmitted via a wire or fiber, such as via a tether 160, or via a free-space signal (e.g., as an electromagnetic waveform propagating in the aquatic environment 110, such as a light wave).

The devices of the swarm 106 operate cooperatively by sharing tactical data, sharing sonar data, sharing computing resources, interacting to achieve common goals, etc. As an example of cooperative operation of the devices of the swarm 106, a first SAS system (e.g., SAS system 170A) associated with a first AUD (e.g., the AUD 120A) emits sound energy that is detected by a second SAS system (e.g., SAS system 170B) associated with a second AUD (e.g., AUD 120B). In this example, the second AUD can send information about the detected sound energy to the first AUD to facilitate generation of sonar image data by the first SAS system. To illustrate, the information sent to the first AUD can indicate a magnitude of sound energy at various wavelengths detected by the second SAS system, which the first SAS system can use as calibration data to configure subsequent pings generated by the first SAS system. In this context, a "ping" refers to one or more sound waves or pulses generated by a sonar system to generate sonar data. Generally for SAS systems 170, each ping includes a plurality of pulses with specified characteristics, such as duration, interval, and wavelength.

In some implementations, ping characteristics used by AUDs 120 of the swarm 106 are selected to limit interference between the SAS systems 170. For example, the timing (e.g., start times) of pings can be selected such that pings do not overlap. Additionally, or alternatively, a coding scheme can be used such that pings generated by various ones of the SAS systems 170 can be distinguished. Signals transmitted via sound energy or electromagnetic waveforms can be used to coordinate selection of ping characteristics used by each SAS system 170. To illustrate, light pulses can be used as a timing signal to schedule pings or pulses emitted by each SAS system 170.

In some implementations, signals transmitted between the AUDs 120 (e.g., via sound energy or electromagnetic waveforms) can be used to coordinate selection of other operational characteristics of the AUDs 120. For example, the AUDs 120 can share tactical data to establish a search pattern to find or identify the suspected enemy device 150. As another example, the AUDs 120 can select navigation courses, speeds, or depths of one or more of the AUDs 120 based on information shared among devices of the swarm 106. As yet another example, the AUDs 120 can use signals transmitted between the AUDs 120 to determine the position of a particular AUD 120 to facilitate processing of sonar returns by the particular AUD 120. To illustrate, one aspect of converting sonar returns received at an SAS system 170 is to perform beamforming based on the phase of a sonar return received at one receiver of the SAS system 170 relative to the phase of the sonar return received at another receiver of the SAS system 170. Phase differences between the receivers of the SAS system 170 are indicative, in part, of the direction of propagation of a plane wave (e.g., the sound wave corresponding to the sonar return) which in turn indicates the direction to the object that reflected the sonar return. However, positional errors due to motion of the SAS system 170, such as surge (fore/aft translation), sway (port/starboard translation), heave (up/down translation) and yaw (fore/aft rotation about a vertical axis), can introduce errors into beamforming calculations if they are not accounted for. In some implementations, signals transmitted between the AUDs 120 can indicate or be used to determine relative positions or position changes among the AUDs 120 to improve beamforming calculations. For example, a first AUD can transmit fore and aft ranging signals (e.g., light pulses) to a second AUD. In this example, the first AUD, the second AUD, or both, can use range information determine based on the ranging signals to detect changes in relative position or orientation of the two AUDs.

According to a particular aspect, the AUDs 120 use one or more machine-learning models to facilitate cooperative operation of devices of the swarm 106, to process sonar data, to detect or identify objects in the aquatic environment, or a combination thereof. For example, a machine-learning model ("ML model") can be used to reduce processing resources required to generate sonar images based on sound energy detected in the aquatic environment 110 as describe further with reference to FIG. 3A. To illustrate, rather than solving a complex set of equations (e.g., beamforming and backprojection algorithms) to determine pixel values of sonar image data based on the sound energy detected by a SAS system 170, the pixel values can be determined using a machine-learning model on board one of the AUDs 120 or distributed among multiple of the AUDs 120.

Figures 3A, 3B:
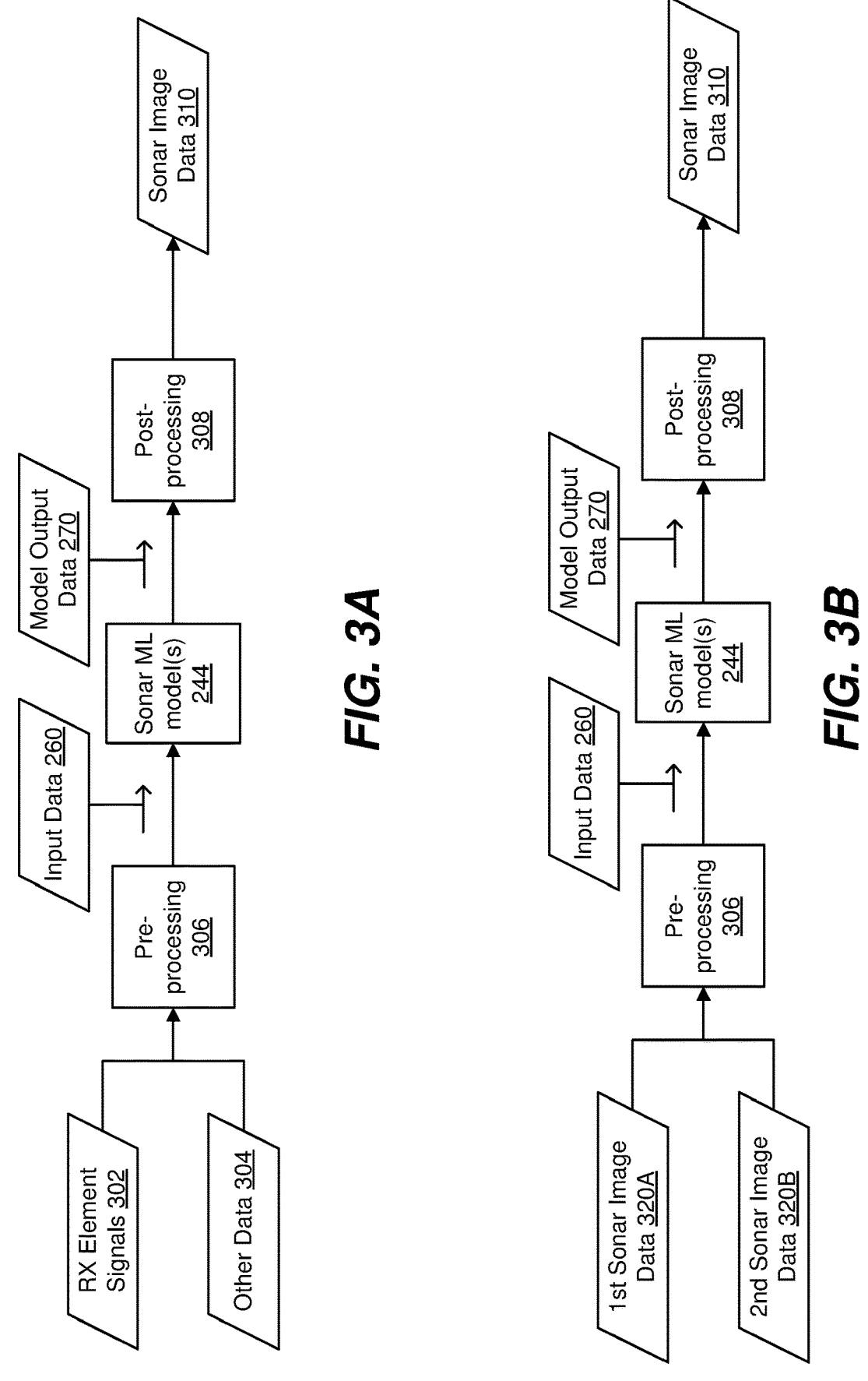
FIGS. 3A, 3B, 3C, and 3D are diagrams illustrating particular aspects of using machine learning to process data generated by one or more synthetic aperture sonar system.

As another example, a machine-learning model can be used to generate an output sonar image based on two or more input sonar images as describe further with reference to FIG. 3B. In this example, the output sonar image may be a synthetic image based on the input sonar images (rather than a mere aggregation of the input sonar images). To illustrate, an image generation ML model can be trained to generate a synthetic image that includes details that are not explicitly included in the input sonar images, such as details that are smaller than a single pixel of any one of the input sonar images.

Figures 3C, 3D:
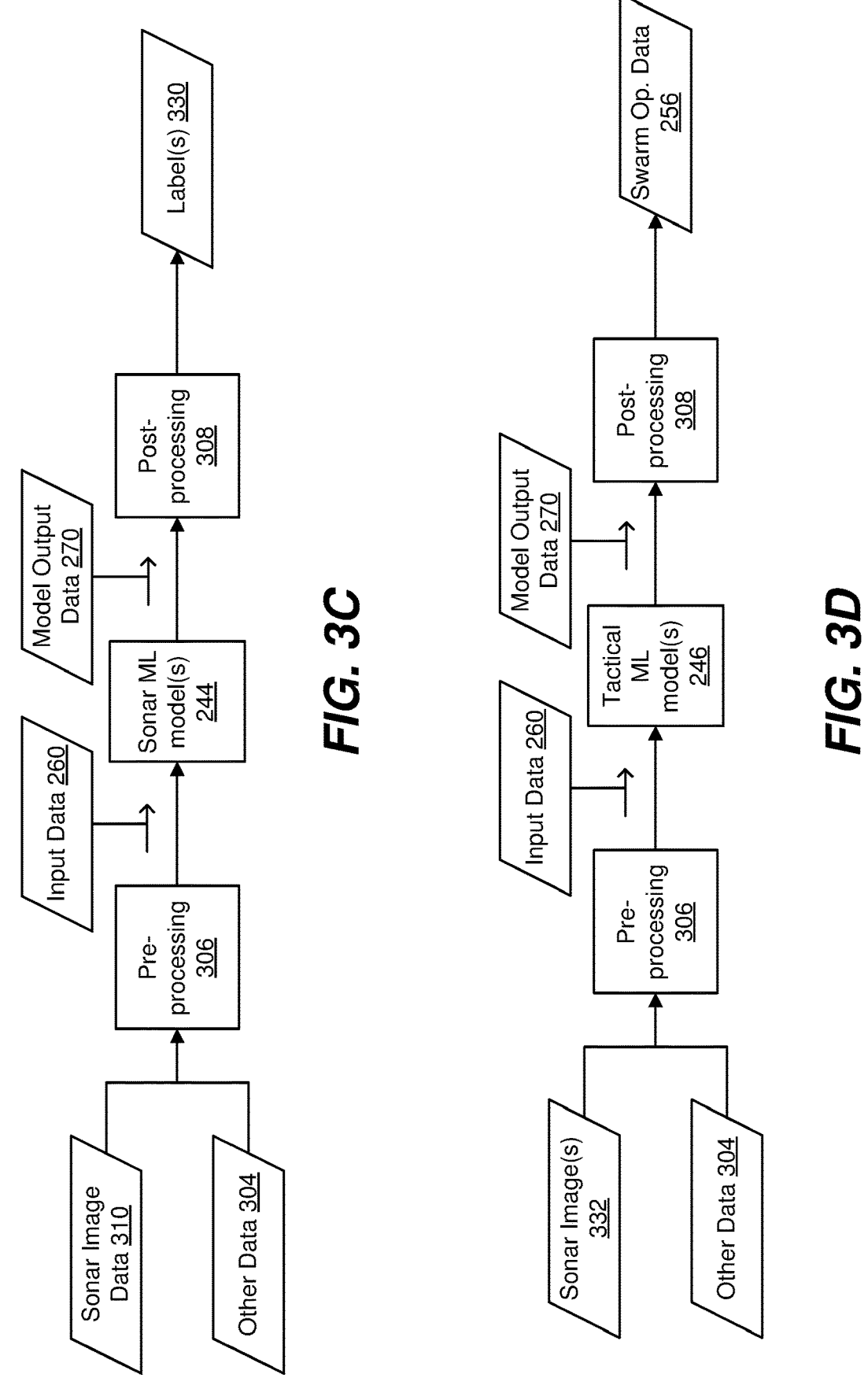

As another example, a machine-learning model can be used to label (e.g., detect, identify, or both) objects in the aquatic environment 110, as described further with reference to FIG. 3C. To illustrate, a ML model onboard one of the AUDs 120 may analyze sonar image data to detect or identify the suspected enemy device 150. In this example, the sonar image data analyzed by the ML model may be generated onboard the AUD 120 that executes the ML model, or the sonar image data can include information gathered by multiple AUDs 120 of the swarm 106. To illustrate, a first AUD can send sonar image data to a second AUD, and the second AUD can provide the sonar image data, as well as sonar image data generated by the second AUD or another AUD, as input to the ML model to label objects in the aquatic environment 110.

As another example, a machine-learning model can be used to coordinate movement and data gathering efforts of the AUDs 120 of the swarm 106, as described further with reference to FIG. 3D. To illustrate, a ML model onboard one of the AUDs 120 may obtain information from one or more other devices of the swarm 106 to generate input data for a tactical ML model. The information provided to the tactical ML model can include sonar image data, position data (e.g., locations of one or more devices of the swarm 106), etc. The tactical ML model may be trained to predict adversarial actions during an engagement between an adversarial agent (e.g., the suspected enemy device 150) and one or more friendly agents (e.g., one or more other AUDs 120), to select responses to detected adversarial actions, or both.

In the example illustrated in FIG. 1, one or more of the surface vehicles 130 is configured to facilitate navigation, communications, or both, among the plurality of AUDs 120 of the swarm 106. For example, the surface vehicles 130 can communicate with other devices (e.g., command and control devices, the satellite, naval vessels, etc.) to obtain information, commands, or both, via relatively long range radiofrequency communications, and can provide information, commands, or both, via relatively short-range communications (e.g., short wavelength light beams, sound waves, tethers 160, etc.) to one or more AUDs 120. In some examples, a set of surface vehicles can be used to facilitate communication, navigation, etc. between swarms of AUDs, between AUDs of a single swarm spread out over a large portion of water, and/or between AUDs and remotely located devices or systems.

In the example illustrated in FIG. 1, the swarm 106 also includes at least one stationary AUD 120F configured to facilitate navigation, communications, or both, among the plurality of autonomous underwater devices of the swarm. For example, the stationary AUD 120F can be deployed at a fixed position and can emit electromagnetic waveforms, sound energy, or both, that the other AUDs 120 can detect to determine their position, ping characteristics, or other information. As another example, the stationary AUD 120F can relay information between two or more of the AUDs 120 to increase an effective communication range among devices of the swarm 106.

Figure 2:
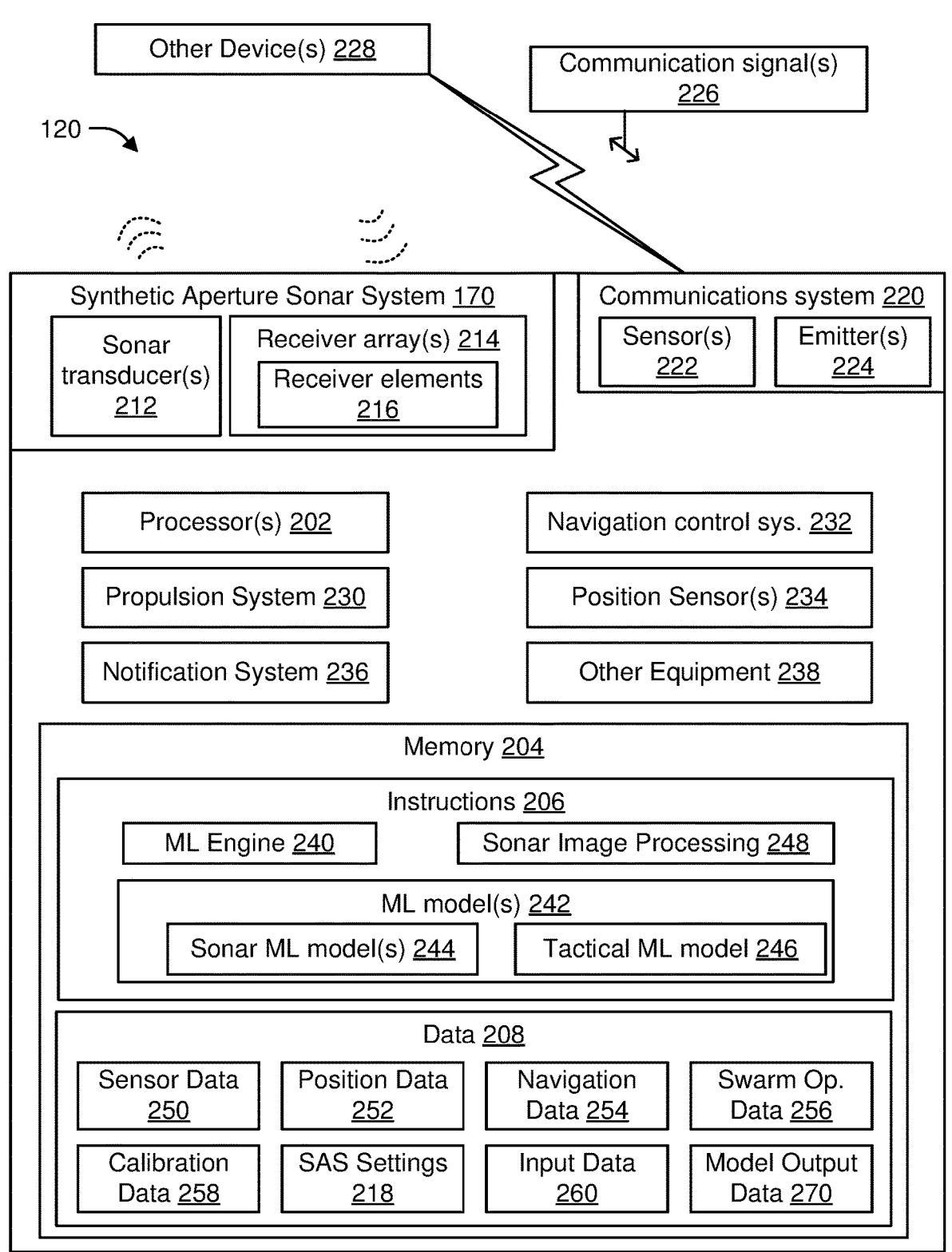
FIG. 2 is a block diagram illustrating particular aspects of execution of autonomous underwater device configured to cooperate with one or more other devices in the swarm of FIG. 1.

FIG. 2 is a block diagram illustrating particular aspects of an example of an autonomous underwater device 120 configured to cooperate with one or more other devices 228 (e.g., other AUDs 120 of the swarm 106 of FIG. 1). The example illustrated in FIG. 2 includes systems and subsystems of a self-propelled AUD 120, such as AUD 120A of FIG. 1. However, the AUD 120 of FIG. 2 may include, be included within, or correspond to any of the AUDs of FIG. 1. To illustrate, in some implementations, the stationary AUD 120F of FIG. 1 corresponds to the AUD 120 of FIG. 2 without a propulsion system 230, a navigation control system 232, or both.

The AUD 120 includes one or more processors 202 and one or more memory devices 204. The memory device(s) 204 store instructions 206 that are executable by the processor(s) 202. For example, the instructions 206 in FIG. 2 include or correspond to a machine learning (ML) engine 240 and sonar image processing instructions 248. The ML engine 240 is configured to perform calculations associated with one or more ML models 242. The sonar image processing instructions 248 are executable to perform image processing operations based on sonar return data. The memory device(s) 204 also store data 208 that is generated by the processor(s) 202 or that is accessible to the processor(s) 202 to perform various actions. The AUD 120 of FIG. 2 also includes a SAS system 170, a communications system 220, the propulsion system 230, the navigation control system 232, one or more position sensors 234, a notification system 236, and other equipment 238 (such as effectors, weapons systems, etc.).

The SAS system 170 includes one or more receiver arrays 214. Each receiver array 214 includes a plurality of receiver elements 216, and each receiver element 216 is configured to generate a signal responsive to detecting sound energy in an aquatic environment. To illustrate, the receiver elements 216 are configured to detect sound energy emitted by a sonar transducer 212 of the AUD 120 (e.g., in an active sonar mode), emitted by a sonar transducer of another AUD (e.g., in a passive sonar mode), or emitted by some other source. In FIG. 2, the SAS system 170 also includes one or more sonar transducers 212, and each sonar transducer 212 is configured to emit sound energy into the aquatic environment via one or more pings. Operation of the SAS system 170 is controlled, at least in part, based on SAS settings 218. For example, the SAS settings 218 may indicate a ping encoding scheme, a ping wavelength, a ping duration, a ping amplitude, a ping interval, ping timing, a navigation course, an along course speed, or a combination thereof.

In some implementations, some of the SAS settings 218 are determined based on conditions within the aquatic environment 110, activities of the swarm 106, commands or information received from the other devices 228, output of ML models, or other factors. For example, the ping encoding scheme, the ping wavelength, the ping duration, the ping amplitude, the ping interval, or a combination thereof, may be set based on calibration data 258 indicating sound propagation characteristics of the aquatic environment. As another example, the ping encoding scheme, the ping wavelength, the ping duration, the ping amplitude, the ping interval, the ping timing, the navigation course, the along course speed, or a combination thereof, may be set based on swarm operation data 256. To illustrate, the swarm operation data 256 may indicate a position or operation of the autonomous underwater devices in the swarm 106, and the navigation control system 232 may set the navigation course based on, at least in part, on the swarm operation data 256 to cause the AUD 120 move in cooperation with other device(s) 228 of the swarm 106. In this illustrative example, the navigation course may be substantially parallel to the courses of one or more other devices 228 of the swarm 106 (e.g., to minimize time needed to generate sonar images of an area), or the navigation course may be non-parallel to courses of one or more other devices 228 of the swarm 106 (e.g., to supplement images generated by the other devices 228, or to reduce shadowing in sonar images). In some implementations, the swarm operation data 256 is used to set the navigation course, the along course speed, or both, to limit sonar signal interference between devices of the swarm 106. Additionally, or alternatively, the ping encoding scheme, the ping wavelength, the ping duration, the ping amplitude, the ping interval, or a combination thereof, may be set to limit sonar signal interference between devices of the swarm 106.

In some implementations, the processor(s) 202 are configured to generate or update the SAS settings 218 based on model output data 270 of one of the ML models 242. For example, in FIG. 2, the ML model(s) 242 include a tactical ML model 246. The tactical ML model 246 is trained to predict (and/or respond to) adversarial actions during an engagement between one or more adversarial agents (e.g., the suspected enemy device 150 of FIG. 1) and one or more friendly agents (e.g., devices of the swarm 106), to select responses to detected adversarial actions, or both. In this example, the model output data 270 generated by the tactical ML model 246 can be used to set the navigation course of the SAS settings 218.

In some implementations, the processor(s) 202 are coupled to the receiver array(s) 214 and configured to receive signals from the receiver elements 216, to generate input data 260 based on the received signals, and to provide the input data 260 to an on-board machine-learning model 242 to generate model output data 270. In such implementations, the model output data 270 includes sonar image data based on the sound energy, a label associated with the sonar image data, or both.

In some implementations, the processor(s) 202 are coupled to the communication system 220, the position sensors 234, or both, and are configured to obtain position data indicating locations of one or more underwater devices of a swarm of devices in an aquatic environment, determine navigation data for at least one device of the swarm of devices based on output of a tactical machine learning model that is trained to predict adversarial actions during an engagement between an adversarial agent and one or more friendly agents, to select responses to detected adversarial actions, or both, and send the navigation data to a navigation control system onboard the at least one device to cause the at least one device to, in cooperation with one or more other devices 228 of the swarm 106, gather synthetic aperture sonar data in a particular area. In such implementations, the model output data 270 includes the swarm operation data 256.

The propulsion system 230 is configured to propel the AUD 120 within the aquatic environment. Although referred to herein as a "propulsion" system, it is to be understood that in various examples, an AUD may include various mechanical and electromechanical components that enable movement in three dimensions, such as one or more propellers, motors, thrusters, engines, pumps that can fill certain chambers with water or air to vary buoyancy, etc. In some implementations, the propulsion system 230 is coupled to the navigation control system 232, and the navigation control system 232 is configured to send navigation control signals to the propulsion system 230. The navigation control signals cause thrusters, ballast, or control surfaces of the AUD 120 to direct movement of the AUD 120. The movements of the AUD 120 are controlled based on the SAS settings 218 (e.g., to time pings with movement of the SAS system 170), sensor data 250 (e.g., to avoid obstacles), position data 252 (e.g., to limit surge, sway, heave, and yaw), the navigation data 254 (e.g., to move along a specified course), the swarm operation data 256 (e.g., to coordinate movement with the other devices 228), or a combination thereof.

In some implementations, the navigation control system 232 is configured to provide position signals (e.g., the position data 252) to the processor(s) 202, and the input data 260 for at least one of the ML model(s) 242 is based on the position signals. For example, the position data 252 may indicate at least one of yaw, surge, or sway of the AUD 120, and the sonar ML model 244 may use the position data 252 to compensate for movement of the AUD 120 when performing beamforming or sonar image processing.

In some implementations, the communications system 220 includes one or more sensors 222 to detect incoming communication signals 226, one or more emitters 224 to generating outgoing communication signals 226, or both. The communication signals 226 include data encoded in sound waves or electromagnetic waves. In some implementations, electromagnetic waves provide greater bandwidth and less sonar interference than sound waves, whereas sound waves generally propagate further in aquatic environments than electromagnetic waves. In some implementations, a mix of sound waves or electromagnetic waves are used to provide data communications between the AUD 120 and the other devices 228. In some implementations, the communications system 220 is coupled to the one or more of the other devices 228 via a wire or fiber. Alternatively, or additionally, the communications system 220 sends and/or receives the communication signal(s) 226 wirelessly. For example, the senor(s) 222 may be configured to detect electromagnetic waveforms encoding the communication signal(s) 226 propagating in the aquatic environment. As another example, the emitter(s) 224 may be configured to emit electromagnetic waveforms encoding the communication signal(s) 226 to propagate in the aquatic environment.

The communication signal(s) 226 can include any of the data 208 illustrated in FIG. 2, as well as other information or commands. For example, the AUD 120 may transmit at least a portion of the model output data 270 to one or more of the other devices 228. In this example, the other device(s) 228 may use the model output data 270 to generate sonar image data, to label objects in sonar image data, to make tactical decisions for the swarm 106, or a combination thereof. In another example, the AUD 120 may receive model output data 270 from a ML model executed on board one or more of the other devices 228. In this example, the processor(s) 202 may use the received model output data 270 to generate sonar image data, to label objects in sonar image data, to make tactical decisions for the swarm 106, or a combination thereof.

In some implementations, the communication signal(s) 226 include at least a portion of the calibration data 258. For example, the receiver array(s) 214 may detect one or more pings emitted by a sonar transducer of another AUD (e.g., one of the other devices 228). In this example, the communications system 220 may transmit, to the other AUD, a communication signal 226 that includes calibration data based on measurements of sound energy of the one or more pings detected at the receiver array(s) 214. Additionally, or alternatively, the sonar transducer(s) 212 may emit one or more pings that are detected by one of the other devices 228. In this example, the communications system 220 may receive, from the other device 228, a communication signal 226 that includes calibration data based on measurements of sound energy of the one or more pings detected at the other device 228.

In some implementations, the input data 260 is based at least in part on information received via that communication signal(s) 226. For example, the communication signal(s) 226 include sonar data based on sonar returns detected by one or more of the other devices 228. In this example, sonar returns detected at the AUD 120 may be used to generate first sonar image data, and the sonar data received via the communication signal(s) 226 may be include second sonar image data. In this example, the input data 260 to the ML model(s) 242 includes the first sonar image data and second sonar image data, and the model output data 270 is based on the first sonar image data and second sonar image data. To illustrate, multiple sonar images from multiple devices (e.g., the AUD 120 and one or more of the other devices 228) can be provided as input to the sonar ML model(s) 244 to generate a single output sonar image. As another illustrative example, the first sonar image data and second sonar image data may be provided as input to the sonar ML model(s) 244 to generate labels for object detected in the sonar image data.

In some implementations, the communication signal(s) 226 include navigation data 254 indicating at least one of a position or a position change of the AUD 120 as detected by one or more of the other devices 228. Alternatively, or additionally, in some implementations, one or more of the position sensor(s) 234 is configured to detect information indicative of a position of the AUD 120 relative to one or more of the other devices 228. In such implementations, the communications system 220 may send communication signal(s) 226 that include the information indicative of the position of the AUD 120 relative to one or more of the other devices 228. The input data 260 may be based, in part, on the position data 252 from the one or more position sensors, the navigation data 254 indicating the position and/or the position change as detected by one or more of the other devices 228, or both.

The notification system 236 is configured to generate an alert responsive to detection of a particular type of object in sonar image data. For example, the notification system 236 may cause the communication system 220 to transmit an alert notification when one of the ML model(s) 242 determines that the sonar image data includes the suspected enemy device 150 of FIG. 1.

FIGS. 3A-3D are diagrams illustrating particular aspects of processing data generated by one or more synthetic aperture sonar systems using machine learning. In a particular implementation, the data processing operations illustrated in FIGS. 3A-3D are performed onboard one or more of the AUD 120 of FIGS. 1 and 2. For example, the processor(s) 202 may execute instructions 206 (such as the machine learning engine 240 and one or more of the machine-learning models 242) from the memory 204 to initiate, perform, or control the operations illustrated in FIGS. 3A-3D. In alternative implementations, different illustrated data processing operations may be performed by different devices (e.g., different AUDs, stationary devices, etc.).

FIG. 3A illustrates an example of processing sonar returns to generate sonar image data (e.g., a sonar image). In some implementations, the operations illustrated in FIG. 3A may be performed instead of, or in conjunction with, beamforming and backprojection to generate a sonar image based on sonar returns as represented by signals ("RX element signals 302 in FIG. 3A) from the receiver elements 216 of a SAS system 170 and other data 304.

In some implementations, the RX element signals 302 include sonar return data for multiple SAS systems 170. To illustrate, the AUD 120A and the AUD 120D may both detect sound energy in the aquatic environment and generate RX element signals 302 based on the detected sound energy. In this illustrative example, the AUD 120A may send a communication signal 226 to send at least a portion of the RX element signals 302 from the AUD 120A to the AUD 120D, and the AUD 120D may process the RX element signals 302 from the AUD 120A along with RX element signals 302 generated at the AUD 120D. In some implementations, the other data 304 includes the sensor data 250, the position data 252, the navigation data 254, the calibration data 258, the SAS settings 218, other data generated by onboard sensors of the AUD 120 or received via communications signals 226, or a combination thereof.

In FIG. 3A, pre-processing 306 is performed to generate the input data 260 based on the RX element signals 302 and the other data 304. In some implementations, the pre-processing 306 includes signal processing operations, such as phase analysis, a domain transform (e.g., a time-domain to frequency domain transform, or vice versa), filtering (e.g., high-pass, low-pass, or bandpass filtering to reduce noise or interference), adjustments based on the calibration data 258, etc. Additionally, or alternatively, in some implementations, the pre-processing 306 includes extracting features from the RX element signals 302, the other data 304, or both, to generate one or more vectors of features corresponding to the input data 260. To illustrate, the features extracted from the RX element signals 302 may include raw sensor data values (e.g., phase, amplitude, or frequency data), processed sensor data values (e.g., a direction to a source of a ping or echo, bathymetry data, spectral power density, etc.), or a combination thereof.

The input data 260 is provided as input to the sonar ML model 244 which generates the model output data 270 based on the input data 260. In some implementations, post-processing 308 operations are performed to generate sonar image data based on the model output data 270. For example, in such implementations, the sonar ML model 244 may perform beamforming and motion compensation operations to generate the model output data 270. In this example, the post-processing 308 may include backprojection operations to generate pixel data of the sonar image data 310 based on the model output data 270.

In other implementations, the model output data 270 includes the sonar image data 310. In such implementations, the post-processing 308 operations may be omitted. Alternatively, post-processing 308 operations to refine the sonar image data 310 for display or transmission can be performed. To illustrate, in such implementations, the post-processing 308 operations can include down sampling or compressing the sonar image data for transmission to another device via one or more communication signals 226.

Generating the sonar image data 310 using one or more trained ML models, as illustrated in FIG. 3A, may use fewer computing resources, such as memory and processor time, than conventional operations to generate sonar image data based on sonar returns. To illustrate, generating sonar images based on synthetic aperture sonar returns conventionally involves solving a rather complex sets of equations (e.g., motion compensation, beamforming, and backprojection algorithms) to determine pixels of the sonar image. Once trained, the sonar ML model 244 can replace all of or some of the conventional calculations using fewer computing resources.

FIG. 3B illustrates an example of processing two or more sonar images (e.g., first sonar image data 320A and second sonar image data 320B) to generate a single output sonar image (e.g., the sonar image data 310). In some implementations, the first and second sonar image data 320 are generated onboard a single AUD 120. For example, the first sonar image data 320A may be generated using a first sonar image processing technique (e.g., a conventional backprojection process), and the second sonar image data 320B may be generated using a second sonar image processing technique (e.g., using the operations described with reference to FIG. 3A).

In some implementations, the first and second sonar image data 320 are generated onboard separate AUD 120. For example, the first sonar image data 320A may be generated onboard the AUD 120A of FIG. 1, and the second sonar image data 320B may be generated onboard the AUD 120B of FIG. 1). In such implementations, the first sonar image data 320A, the second sonar image data 320B, or both, are sent to another device (e.g., to the AUD 120A, to the AUD 120B, or to another AUD 120 of FIG. 1) for processing according to the operations of FIG. 3B.

In FIG. 3B, the pre-processing 306 is performed to generate the input data 260 based on the two or more sonar images and possibly other data. In some implementations, the pre-processing 306 includes pixel alignment operations, scaling, or other operations to normalize the sonar images. Additionally, or alternatively, in some implementations, the pre-processing 306 includes extracting features from the first and second sonar image data 320 to generate one or more vectors of features corresponding to the input data 260.

The input data 260 is provided as input to the sonar ML model 244 which generates the model output data 270 based on the input data 260. In some implementations, post-processing 308 operations are performed to generate the sonar image data 310 based on the model output data 270. For example, in such implementations, the sonar ML model 244 may perform beamforming and motion compensation operations on a combined data set that includes the first and second sonar image data 320 to generate the model output data 270. In this example, the post-processing 308 may include backprojection operations to generate pixel data of the sonar image data 310 based on the model output data 270.

In other implementations, the model output data 270 includes the sonar image data 310. In such implementations, the post-processing 308 operations may be omitted. Alternative, post-processing 308 operations to refine the sonar image data 310 for display or transmission can be performed. To illustrate, in such implementations, the post-processing 308 operations can include down sampling or compressing the sonar image data for transmission to another device via one or more communication signals 226.

In some implementations, the sonar ML model(s) 244 generate the model output data 270 by combining (or compositing) the first and second sonar image data 320. In other implementations, the sonar ML model(s) 244 includes an image generation model that generates a synthetic sonar image based on the first and second sonar image data 320. For example, the sonar ML model(s) 244 can be trained using a generative adversarial network (GAN) technique to generate a sonar image that includes or is based on aspects of the two or more input sonar images. To illustrate, the sonar ML model(s) 244 may be trained to emphasize (e.g., apply relatively higher weight to) some aspects of the sonar image data 320 and to de-emphasize (e.g., apply relatively lower weight to) other aspects of the sonar image data 320 to simplify or improve object detection by another ML model 242 or by a human.

Generating the sonar image data 310 using one or more trained ML models, as illustrated in FIG. 3B, may generate a more detailed sonar image, a sonar image that is improved (relative to the input sonar images) in certain respects (e.g., resolution) or for certain uses (e.g., for object detection), or both.

FIG. 3C illustrates an example of identifying (e.g., detecting and/or labeling) objects in sonar image data 310 (e.g., a sonar image). In some implementations, the operations illustrated in FIG. 3C may be performed onboard one or more of the AUDs 120 of FIG. 1. The sonar image data 310 used as input in FIG. 3C may include the sonar image data 310 generated by the operations of FIG. 3A, the sonar image data 310 generated by the operations of FIG. 3B, or sonar image data generated via another set of operations, such as via a conventional backprojection technique.

In FIG. 3C, pre-processing 306 is performed to generate the input data 260 based on the sonar image data 310 and possibly other data 304 (such as indicators of types of target objects that are to be labeled). In some implementations, the pre-processing 306 includes extracting features from the sonar image data 310, the other data 304, or both, to generate one or more vectors of features corresponding to the input data 260.

The input data 260 is provided as input to the sonar ML model 244, which generates the model output data 270 based on the input data 260. In some implementations, post-processing 308 operations are performed to generate the label(s) 330. For example, in such implementations, the sonar ML model 244 includes an embedding network to generate an embedding based at least a portion of the input data 260 and the post-processing 308 operations include comparing the embedding based on the input data 260 to embeddings of target objects that are to be detected. In this example, the sonar ML model 244 operations in the manner of a prototypical network for few-shot learning.

In other implementations, the model output data 270 includes the label(s) 330. In such implementations, the post-processing 308 operations may be omitted.

Using the sonar ML model 244 as described with reference to FIG. 3C enables onboard object detection by one or more of the AUDs 120 of FIG. 1. When a particular object or type of object is detected, the AUD 120 can generate a notification using an onboard notification system 236 as described with reference to FIG. 2.

FIG. 3D illustrates an example of using machine learning to coordinate activities among devices of the swarm 106 of FIG. 1. In some implementations, the operations illustrated in FIG. 3D may be performed onboard one or more of the AUDs 120 of FIG. 1. The sonar image(s) 332 used as input in FIG. 3D may include, correspond to, or be derived from the sonar image data 310 generated by the operations of FIG. 3A, the sonar image data 310 generated by the operations of FIG. 3B, or sonar image data generated via another set of operations, such as via a conventional backprojection technique.

In FIG. 3D, pre-processing 306 is performed to generate the input data 260 based on the sonar image(s) 332 and possibly other data 304 (such as navigation data 254, position data 252, sensor data 250, swarm operations data 256 from a prior time period, or any combination thereof). In some implementations, the pre-processing 306 includes extracting features from the sonar image data 310, the other data 304, or both, to generate one or more vectors of features corresponding to the input data 260.

The input data 260 is provided as input to the tactical ML model 246 which generates the model output data 270 based on the input data 260. In some implementations, post-processing 308 operations are performed to generate the swarm operations data 256. In other implementations, the model output data 270 includes the swarm operations data 256. In such implementations, the post-processing 308 operations may be omitted. Alternatively, the post-processing 308 operations can include generating navigation data for one or more of the AUDs 120 based on the model output data 270.

Using the tactical ML model 246 as described with reference to FIG. 3D facilitates cooperative action among the devices of the swarm 106.

FIG. 4 is a flow chart of a particular method 400 of processing data generated by one or more synthetic aperture sonar systems using machine learning. The operations described with reference to FIG. 4 may be performed onboard one or more of the AUDs 120 of FIGS. 1 and 2. To illustrate, the method 400 may be initiated, performed, or controlled by the processor(s) 202 of the AUD 120 of FIG. 2.

The method 400 includes, at 402, emitting, from a first AUD, sound energy in an aquatic environment via one or more pings. For example, the sonar transducer 212 of FIG. 2 can emit one or more pings into the aquatic environment.

The method 400 includes, at 404, receiving, at the first AUD from a second AUD, an electromagnetic waveform encoding a communication signal. For example, the sensor(s) 222 of the communications system 220 of FIG. 2 can receive the communication signal(s) 226 via an electromagnetic waveform. In some implementations, the electromagnetic waveform propagates through the aquatic environment. In some implementations, the electromagnetic waveform propagates through a wire or fiber, such as via one of the tethers 160 of FIG. 1.

The method 400 includes, at 406, detecting, at the first AUD, sonar returns based on the one or more pings. For example, one or more of the receiver elements 216 of the receiver array(s) 214 of FIG. 2 may receive the sonar returns based on the ping(s). As another example, the SAS system 170 of a different AUD (e.g., a second AUD) may detect the sonar returns and transmit a communication signal 226 that includes the sonar returns to the first AUD.

The method 400 includes, at 408, generating input data based on the sonar returns and the communication signal. For example, the sonar returns may correspond to the RX element signals 302 of FIG. 3A, and the RX element signals 302 and the other data 304 can be processed to generate the input data 260.

The method 400 includes, at 410, providing the input data to a machine learning model on-board the first AUD to generate model output data. For example, as described with reference to FIG. 3A, the input data 260 may be provided to the sonar ML model 244, which generates the model output data 270. In some implementations, the model output data 270 includes sonar image data 310 based on the sonar returns, a label 330 associated with the sonar image data 310, or both.

In some implementations, the method 400 includes determining SAS settings data based on the communication signal. For example, a second AUD may detect the ping(s) emitted by the first AUD and transmit calibration data 258 or data descriptive of the detected ping(s) via the communication signal(s) 226. In this example, the SAS settings 218 may be determined based on the data transmitted via the communication signal(s) 226 and used by a first SAS system to select SAS settings 218 that limit interference between the first SAS of the first AUD and a second SAS system of the second AUD.

In some implementations, the method 400 includes processing the sonar returns based on the SAS settings data (e.g., the SAS settings 218 of FIG. 2) to generate the input data. For example, the RX element signals 302 of FIG. 3A may be filtered, sampled, or otherwise processed by the pre-processing 306 operations to generate the input data 260 based on the SAS settings 218.

As another example, in some implementations, the method 400 includes setting parameters of a second ping responsive to the communication signal. In this example, the sonar returns are based on the second ping. For example, an initial set of pings may be sent by the sonar transducer(s) 212 and received by one or more of the other devices 228. Subsequently, the one or more other devices 228 may send the communication signal(s) 226 based on detecting the initial set of pings. In this example, communication signal(s) 226 include or are used to determine the calibration data 258, which is used to set parameters for the one or more ping(s) of the method 400 of FIG. 4.

In some implementations, the method 400 includes performing beamforming of the sonar returns based on the communication signal. For example, the pre-processing 306 operations of FIG. 3A may include performing beamforming based on the RX element signals 302.

In some implementations, the method 400 includes determining first sonar image data based on the sonar returns. In such implementations, the communication signal received in FIG. 4 includes second sonar image data from another AUD, and the sonar image data based on sonar returns received at the first AUD include first sonar image data. In such implementations, the first sonar image data 320A and the second sonar image data 320B are used to generate the input data 260 provided to the sonar ML model(s) 244 to generate the model output data 270.

In some implementations, the method 400 includes generating an alert responsive to detection of a particular type of object in the sonar image data. For example, when the model output data 270 include the label(s) 330, as in FIG. 3C, the notification system 236 may generate an alert when a particular label is assigned, or when a particular object or type of object is detected.

In some implementations, the method 400 includes sending the sonar image data, the label, or both, to another autonomous underwater device of a swarm of autonomous underwater device, where the swarm of autonomous underwater device includes the first autonomous underwater device and the second autonomous underwater device. In such implementations, the method 400 also includes detecting, at one or more receiver arrays of the first autonomous underwater device, a ping emitted by the second autonomous underwater device. In such implementations, the method 400 may include determining, based on the ping emitted by the second autonomous underwater device, calibration data based on the detected ping. To illustrate, the calibration data may indicate measurements of sound energy responsive to emission of the ping. In some such implementations, the method 400 also includes transmitting the calibration data to the second autonomous underwater device.

FIG. 5 is a flow chart of another example of a method 500 of processing data generated by one or more synthetic aperture sonar system using machine learning. The operations described with reference to FIG. 5 may be performed onboard one or more of the AUDs 120 of FIGS. 1 and 2. To illustrate, the method 500 may be initiated, performed, or controlled by the processor(s) 202 of the AUD 120 of FIG. 2

The method 500 includes, at 502, obtaining position data indicating locations of one or more devices of a swarm of devices in an aquatic environment. For example, the position data 252 of FIG. 2 may be obtained via the communication signal(s) 226, from the position sensor(s) 234, or both.

The method 500 includes, at 504, determining navigation data for at least one device of the swarm of devices based on output of a tactical machine learning model that is trained to predict adversarial actions during an engagement between an adversarial agent and one or more friendly agents, to select responses to detected adversarial actions, or both. For example, the tactical ML model 246 may generate the swarm operation data 256, which includes or can be used to determine navigation data 254 for one or more of the AUDs 120.

The method 500 includes, at 506, sending the navigation data to a navigation control system onboard the at least one device to cause the at least one device to, in cooperation with one or more other devices of the swarm of device, gather synthetic aperture sonar data in a particular area. For example, at least a portion of the navigation data 254 may be transmitted via the communication signal(s) 226 to the other device(s) 228.

In some implementations, gathering the SAS data in cooperation with the one or more other devices of the swarm of devices includes emitting sound energy via one or more pings from a first AUD, detecting sonar returns based on the ping(s) at the first AUD, and generating sonar image data based on the sonar returns. In some such implementations, generating the sonar image data based on the sonar returns includes generating input data based on the sonar returns and providing the input data to a machine learning model on-board the first AUD to generate model output data, where the model output data includes the sonar image data. In such implementations, the sonar image data, label(s) assigned based on the sonar image data, or other information may be transmitted, via the communication signal(s) 226 to the one or more other devices 228 of the swarm 106.

In some implementations, generating the sonar image data based on the sonar returns includes generating a first sonar image based on a first portion of the sonar returns using a first sonar image processing technique, generating a second sonar image based on the first portion of the sonar returns using a second sonar image processing technique, and providing input data representing the first sonar image and the second sonar image to a machine learning model on-board the first AUD to generate model output data. In such implementations, the model output data may include the sonar image data. For example, the method 500 may include one or more of the operations described with reference to FIG. 3B where the first sonar image data 320A is from the same AUD as second sonar image data 320B.

In some implementations, generating the sonar image data based on the sonar returns includes generating a first sonar image at the first AUD, receiving a second sonar image via a communicating signal from a second AUD of the swarm of devices, and providing input data representing the first sonar image and the second sonar image to a machine learning model on-board the first AUD to generate model output data, where the model output data includes the sonar image data. For example, the method 500 may include one or more of the operations described with reference to FIG. 3B where the first sonar image data 320A is from a different AUD than the second sonar image data 320B. In some such implementations, the second sonar image is based on the one or more pings emitted by the first AUD and detected at the second AUD. In other such implementations, the second sonar image is based on one or more second pings emitted by the second AUD and detected at the second AUD.

In some implementations, the position data is received at a first AUD of the swarm of devices from a second AUD of the swarm of devices, e.g., via the communication signal(s) 226. In some implementations, the position data indicates at least one of yaw, surge, or sway, of the first AUD relative to the second AUD.

In some implementations, gathering the synthetic aperture sonar data in cooperation with the one or more other devices of the swarm of devices includes selecting one or more SAS settings to limit interferences between SAS systems of devices of the swarm of devices. For example, the one or more SAS settings may include a ping encoding scheme, a ping wavelength, a ping duration, a ping amplitude, a ping interval, ping timing, a navigation course, an along course speed, or a combination thereof, that are selected to limit or reduce interference with other SAS systems of the swarm.

In some implementations, the navigation data indicates a navigation course of the at least one device, an area to be imaged by the at least one device, or both. In some implementations, sending the navigation data include transmitting a waveform that encodes the navigation data through the aquatic environment including the swarm of devices. In other implementations, sending the navigation data include transmitting the navigation data via a wire or fiber coupled between a first AUD of the swarm of devices and a second AUD of the swarm of devices. In some implementations, the navigation data is determined at one or more processors onboard a first AUD, and the navigation data is sent to a navigation control system onboard the first AUD. In such implementations, the navigation control system onboard the first AUD is configured to send navigation control signals to a propulsion system of the first autonomous underwater device to cause the first AUD to move to the particular area.

Figure 6:
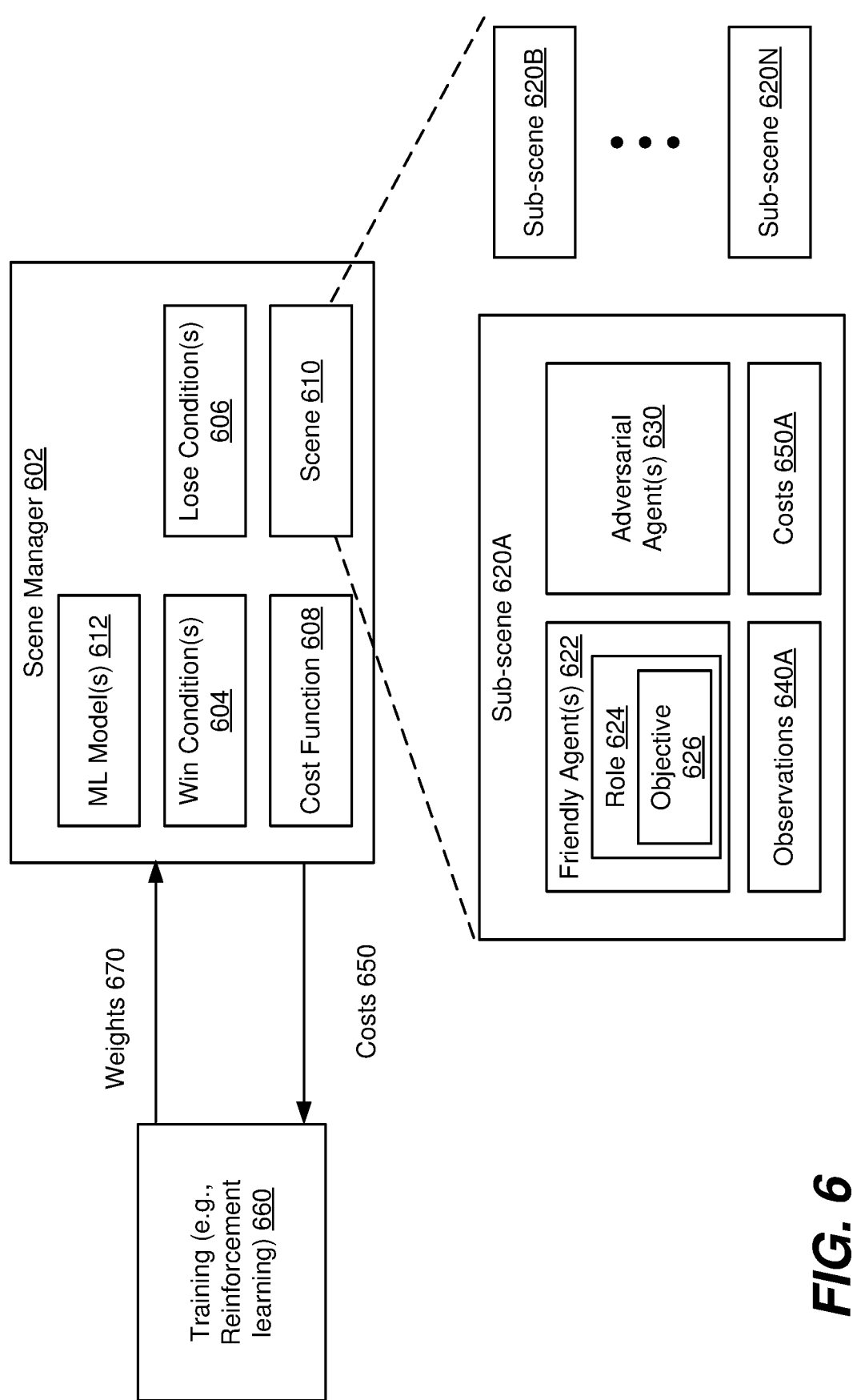
FIG. 6 is a diagram illustrating particular aspects of training a machine learning model used by one or more devices of the swarm of FIG. 1.

FIG. 6 is a diagram illustrating particular aspects of training one or more machine-learning models 612 that may be used by one or more devices of the swarm of FIG. 1. For example, operations described with reference to FIG. 6 may be used to train one or more ML models 612 which may include or correspond to the tactical ML model(s) 246 of FIGS. 2 and 3D. In this context, training of a model refers to reinforcement learning, including iteratively running scenarios or otherwise applying training data to the model and modifying parameters (e.g., weights 670) of the ML model(s) 612 to maximize a reward calculated by a reward function or minimize a cost 650 calculated by a cost function 608. The operations described with reference to FIG. 6 may be performed onboard one of the AUDs 120, such as by the ML engine 240. Alternatively, the operations may be performed remotely, and the resulting ML model may be subsequently stored in the memory 204 of the AUD 120.

In some situations, the swarm 106 of devices may be opposed by one or more enemy devices, such as the suspected enemy device 150. This situation is referred to as a multiagent adversarial scene (e.g., a "scene" 610 in FIG. 6) in which one or more friendly agents 622 (e.g., representing devices of the swarm 106) attempt to reach one or more defined win conditions 604 and prevent one or more lose conditions 606. The one or more friendly agents 622 are opposed by one or more adversarial agents 630 (e.g., the suspected enemy device 150) attempting to reach their own defined win conditions and prevent their own lose conditions.

In the context of the multiagent adversarial scene 610, a friendly agent 622 represents a decision making autonomous agent, application, or module configured to determine behavioral actions for an agent device. The autonomous agent may be implemented as a software agent, a hardware agent, or combinations thereof. For example, the agent device may comprise one of the AUDs 120 of FIG. 1. The adversarial agent(s) 630 referred to herein may include agents controlling adversarial agent devices, agents controlling simulated agent devices, human- or user-operated devices, adversarial agent devices themselves (simulated or not), and the like. References to agents (friendly or adversarial) in a physical or simulated space may be considered references to the corresponding agent device in physical or simulated space. In other words, in the context of physical locations, placement, distances, and the like in an environment, an "agent" and "agent device" may be referred to interchangeably. For example, a position of a friendly agent 622 relative to an adversarial agent 630 would be construed to mean the position of the friendly agent device relative to the adversarial agent device in physical or simulated space.

In the example illustrated in FIG. 6, a scene manager 602 oversees simulation of the scene 610 and assigns a role 624 to each of one or more friendly agents 622. The role 624 for a friendly agent 622 may include one or more objectives 626 in the context of the multiagent adversarial scene 610. For example, a role 624 of a friendly agent 622 may include "engaging" one or more designated adversarial agents 630. Engaging an adversarial agent 630 may include detecting the adversarial agent 630, identifying the adversarial agent 630, destroying the adversarial agent 630, obstructing movement of the adversarial agent 630, and the like. As another example, a role 624 of a friendly agent 622 may include protecting a high value asset, remaining in reserves or a designated area of a space or engagement zone, and the like. In a swarm deployment for synthetic aperture sonar, AUDs may have roles that include one or more of ping transmitter, ping receiver, machine learning model executor, image data processor, sonar data communicator, data relay (e.g., for data traveling from a distant AUD to a stationary device), etc. In some implementations, AUD roles also indicate relative positioning of the AUDs so that a target sonar region is sufficiently covered by ping transmission/receipt operations of the AUD. Such relative positioning may be determined based on reinforcement learning in a system that simulates the real-life aquatic environment in which the swarm will be deployed, as further described herein. The scene manager 602 may be implemented using by the processor(s) 202 of one or more of the AUDs 120 of the swarm 106 or by another device, such as one or more remote computing devices.

The multiagent adversarial scene 610 includes the totality of all agents (friendly and adversarial) and the totality of their associated states and observations 640. A sub-scene 620 as referred to herein is a functional subunit of the scene 610. Each sub-scene 620 is treated as being functionally independent. Sub-scenes 620 for a given scene 610 may include each grouping of friendly agents 622 assigned to a same role 624 (e.g., assigned to engage the same one or more adversarial agents 630, assigned to defend a high value asset (or detect an enemy underwater device moving towards a high value asset or location), and the like). Each sub-scene 620 may also include observations 640 (e.g., by the friendly agents 622 and their corresponding agent devices) in the environment relative. Observations 640 of a given entity may include the determined or perceived position, velocity, and the like of the given entity and/or the determined or perceived positions, velocities, and the like of other entities in the sub-scene 620 (e.g., relative to the given entity). Using the example above, a sub-scene 620 may include a predefined area relative to (e.g., centered around) an adversarial agent device 630.

Assigning a role 624 to a friendly agent 622 may include calculating a plurality of costs 650. The plurality of costs 650 may each correspond to a role 624 of one or more roles (e.g., a cost 650 for each possible combination of assigning each role 624 to each particular friendly agent 622). A role 624 is then selected based on the costs 650. For example, for each friendly agent 622, a cost 650 may be calculated for engaging the friendly agent 622 with each possible adversarial agent 630. The plurality of costs 650 may be expressed as a table or matrix, with one dimension corresponding to friendly agents 622 (e.g., rows) and another dimension (e.g., columns) corresponding to an adversarial agent 630 engagement.

During training of the ML model(s) 612, the scene manager 602 executes a current version (or current versions) of the ML model(s) 612 to assign the roles 624 based on one or more rules for engagement with adversarial agents 630. Assuming that the scene manager 602 is restricted to particular configurations for engagement, where the number of friendly agents 622 greatly exceeds the number of adversarial agents 630, there may be a threshold number of possible friendly agents 622 to assign an engagement role 624. As an example, where eight friendly agents 622 are opposed by two adversarial agents 630 and the scene manager 602 is restricted to 1v1 and 2v1 engagement configurations, at most four friendly agents 622 can be assigned to engage the adversarial agents 630. Accordingly, four friendly agents 622 may be assigned a non-engagement or default roles 624 (e.g., defense, reserve, and the like). In the context of swarm-based synthetic aperture sonar, the scene manager 602 may be restricted in terms of the number of deployable AUDs, characteristics of the simulated aquatic environment (e.g., dimensions, temperature, underwater surface topography, water temperature, etc.), a desired portion of the environment to cover with sonar detection capability, etc.

A cost function 608 used to calculate the costs 650 may be tuned depending on the particular multiagent adversarial scene 610. The cost function 608 may be based on distance between agents, weighted linear combinations of costs, and the like.

The scene manager 602 uses a training module 660 to train the weights of the ML model(s) 612 via reinforcement learning. For example, each role 624 (e.g., engagement configuration) and policy combination corresponds to a ML model(s) 612. To ensure coverage with respect to the entire state space of a given sub-scene 620, the training includes simulating friendly agent(s) 622 in an environment of a simulated state space relative to a simulated adversarial agent 630. For example, simulated friendly agent(s) 622 may be placed in a simulated state space according to some initial condition. For example, the simulated friendly agent(s) 622 may be placed randomly, or randomly relative to another object. As an example, the simulated friendly agent(s) 622 may be randomly placed in a coordinate system centered on a simulated adversarial agent 630. The simulation is then run. Friendly agent placement and simulations are repeatedly performed until a termination condition is met (e.g., convergence to meeting desired criteria, or a maximum number of steps or iterations are performed). In some embodiments, the simulated friendly agent(s) 622 are placed within a constrained area within the simulated state space (e.g., close to an engaged adversarial agent 630). The constrained area may be expanded over time in order such that the ML model(s) 612 are trained within easier constraints first, then with broader constraints and more computationally complex simulations later.

The scene manager 602 implements the training and simulation using various hyperparameters defining operational attributes of the scene manager 602, thresholds, and the like, as well as hyperparameters for learning models used by the training module 660 (e.g., learning rate, discount facture, overall structure, and the like). The term "hyperparameter" in this context refers to any attribute or parameter that is preset or predefined for use by the scene manager 602 in performing the determinations described herein. The scene manager 602 may be configured to run multiple simulations of multiagent adversarial scenes 610 using various combinations of hyperparameters and evaluate the performance of the simulations using various metrics (e.g., friendly agent victories, adversarial agent victories, elimination rates for friendly or adversarial agents, and the like). The optimal combination of hyperparameters may then be used by the scene manager 602.

The scene manager 602 provides a highest level for observing the full world, assigning roles 624, and invoking appropriate policies and models. The middle level provided by friendly agents 622 controls invoking policies through the execution of their mission via the designated tactical model. This layered approach provides several advantages, such as portability between devices and training efficiency. For example, each layer can be trained individually and independently of the others, thereby reducing the action space that must be considered for learning a policy for that level. Moreover, the ML model(s) 612 may be trained on the sub-scene level, further reducing the action space and training space.

Referring to FIG. 7, a particular illustrative example of a system 700 for executing automated model builder instructions to generate a machine-learning model used by the system of FIG. 1 or FIG. 2 is shown. The system 700, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the automated model builder instructions include a genetic algorithm 710 and an optimization trainer 760. The optimization trainer 760 is, for example, a backpropagation trainer, a derivative free optimizer (DFO), an extreme learning machine (ELM), etc. In particular implementations, the genetic algorithm 710 is executed on a different device, processor (e.g., central processor unit (CPU), graphics processing unit (GPU) or other type of processor), processor core, and/or thread (e.g., hardware or software thread) than the optimization trainer 760. The genetic algorithm 710 and the optimization trainer

760 are executed cooperatively to automatically generate a machine-learning model (e.g., one or more of the machine-learning models 242 of FIG. 2 and referred to herein as "models" for ease of reference), such as a neural network or an autoencoder, based on the input data 702. The system 700 performs an automated model building process that enables users, including inexperienced users, to quickly and easily build highly accurate models based on a specified data set.

During configuration of the system 700, a user specifies the input data 702. In some implementations, the user can also specify one or more characteristics of models that can be generated. In such implementations, the system 700 constrains models processed by the genetic algorithm 710 to those that have the one or more specified characteristics. For example, the specified characteristics can constrain allowed model topologies (e.g., to include no more than a specified number of input nodes or output nodes, no more than a specified number of hidden layers, no recurrent loops, etc.). Constraining the characteristics of the models can reduce the computing resources (e.g., time, memory, processor cycles, etc.) needed to converge to a final model, can reduce the computing resources needed to use the model (e.g., by simplifying the model), or both.

The user can configure aspects of the genetic algorithm 710 via input to graphical user interfaces (GUIs). For example, the user may provide input to limit a number of epochs that will be executed by the genetic algorithm 710. Alternatively, the user may specify a time limit indicating an amount of time that the genetic algorithm 710 has to execute before outputting a final output model, and the genetic algorithm 710 may determine a number of epochs that will be executed based on the specified time limit. To illustrate, an initial epoch of the genetic algorithm 710 may be timed (e.g., using a hardware or software timer at the computing device executing the genetic algorithm 710), and a total number of epochs that are to be executed within the specified time limit may be determined accordingly. As another example, the user may constrain a number of models evaluated in each epoch, for example by constraining the size of an input set 720 of models and/or an output set 730 of models.

The genetic algorithm 710 represents a recursive search process. Consequently, each iteration of the search process (also called an epoch or generation of the genetic algorithm 710) has an input set 720 of models (also referred to herein as an input population) and an output set 730 of models (also referred to herein as an output population). The input set 720 and the output set 730 may each include a plurality of models, where each model includes data representative of a machine learning data model. For example, each model may specify a neural network or an autoencoder by at least an architecture, a series of activation functions, and connection weights. The architecture (also referred to herein as a topology) of a model includes a configuration of layers or nodes and connections therebetween. The models may also be specified to include other parameters, including but not limited to bias values/functions and aggregation functions.

For example, each model can be represented by a set of parameters and a set of hyperparameters. In this context, the hyperparameters of a model define the architecture of the model (e.g., the specific arrangement of layers or nodes and connections), and the parameters of the model refer to values that are learned or updated during optimization training of the model. For example, the parameters include or correspond to connection weights and biases.

In a particular implementation, a model is represented as a set of nodes and connections therebetween. In such implementations, the hyperparameters of the model include the data descriptive of each of the nodes, such as an activation function of each node, an aggregation function of each node, and data describing node pairs linked by corresponding connections. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In another particular implementation, the model is represented on a layer-by-layer basis. For example, the hyperparameters define layers, and each layer includes layer data, such as a layer type and a node count. Examples of layer types include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tanh activation function. In such implementations, the hyperparameters of a layer include layer type, node count, activation function, and aggregation function. Further, a complete autoencoder is specified by specifying an order of layers and the hyperparameters of each layer of the autoencoder.

In a particular aspect, the genetic algorithm 710 may be configured to perform speciation. For example, the genetic algorithm 710 may be configured to cluster the models of the input set 720 into species based on "genetic distance" between the models. The genetic distance between two models may be measured or evaluated based on differences in nodes, activation functions, aggregation functions, connections, connection weights, layers, layer types, latent-space layers, encoders, decoders, etc. of the two models. In an illustrative example, the genetic algorithm 710 may be configured to serialize a model into a bit string. In this example, the genetic distance between models may be represented by the number of differing bits in the bit strings corresponding to the models. The bit strings corresponding to models may be referred to as "encodings" of the models.

After configuration, the genetic algorithm 710 may begin execution based on the input data 702. Parameters of the genetic algorithm 710 may include but are not limited to, mutation parameter(s), a maximum number of epochs the genetic algorithm 710 will be executed, a termination condition (e.g., a threshold fitness value that results in termination of the genetic algorithm 710 even if the maximum number of generations has not been reached), whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 710 uses a single mutation parameter or set of mutation parameters for all of the models. In such examples, the mutation parameter may impact how often, how much, and/or what types of mutations can happen to any model of the genetic algorithm 710. In alternative examples, the genetic algorithm 710 maintains multiple mutation parameters or sets of mutation parameters, such as for individual or groups of models or species. In particular aspects, the mutation parameter(s) affect crossover and/or mutation operations, which are further described below.

For an initial epoch of the genetic algorithm 710, the topologies of the models in the input set 720 may be randomly or pseudo-randomly generated within constraints specified by the configuration settings or by one or more architectural parameters. Accordingly, the input set 720 may include models with multiple distinct topologies. For example, a first model of the initial epoch may have a first topology, including a first number of input nodes associated with a first set of data parameters, a first number of hidden layers including a first number and arrangement of hidden nodes, one or more output nodes, and a first set of interconnections between the nodes. In this example, a second model of the initial epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes. Further, one or more layers of the first model can be of a different layer type that one or more layers of the second model. For example, the first model can be a feedforward model, with no recurrent layers; whereas, the second model can include one or more recurrent layers.

The genetic algorithm 710 may automatically assign an activation function, an aggregation function, a bias, connection weights, etc. to each model of the input set 720 for the initial epoch. In some aspects, the connection weights are initially assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. Aggregation functions may similarly be randomly or pseudo-randomly assigned for the models in the input set 720 of the initial epoch. Thus, the models of the input set 720 of the initial epoch may have different topologies (which may include different input nodes corresponding to different input data fields if the data set includes many data fields) and different connection weights. Further, the models of the input set 720 of the initial epoch may include nodes having different activation functions, aggregation functions, and/or bias values/functions.

During execution, the genetic algorithm 710 performs fitness evaluation 740 and evolutionary operations 750 on the input set 720. In this context, fitness evaluation 740 includes evaluating each model of the input set 720 using a fitness function 742 to determine a fitness function value 744 ("FF values" in FIG. 7) for each model of the input set 720. The fitness function values 744 are used to select one or more models of the input set 720 to modify using one or more of the evolutionary operations 750. In FIG. 7, the evolutionary operations 750 include mutation operations 752, crossover operations 754, and extinction operations 756, each of which is described further below.

During the fitness evaluation 740, each model of the input set 720 is tested based on the input data 702 to determine a corresponding fitness function value 744. For example, a first portion 704 of the input data 702 may be provided as input data to each model, which processes the input data (according to the network topology, connection weights, activation function, etc., of the respective model) to generate output data. The output data of each model is evaluated using the fitness function 742 and the first portion 704 of the input data 702 to determine how well the model modeled the input data 702. In some examples, fitness of a model is based on reliability of the model, performance of the model, complexity (or sparsity) of the model, size of the latent space, or a combination thereof.

In a particular aspect, fitness evaluation 740 of the models of the input set 720 is performed in parallel. To illustrate, the system 700 may include devices, processors, cores, and/or threads 780 in addition to those that execute the genetic algorithm 710 and the optimization trainer 760. These additional devices, processors, cores, and/or threads 780 can perform the fitness evaluation 740 of the models of the input set 720 in parallel based on a first portion 704 of the input data 702 and may provide the resulting fitness function values 744 to the genetic algorithm 710.

The mutation operation 752 and the crossover operation 754 are highly stochastic under certain constraints and a defined set of probabilities optimized for model building, which produces reproduction operations that can be used to generate the output set 730, or at least a portion thereof, from the input set 720. In a particular implementation, the genetic algorithm 710 utilizes intra-species reproduction (as opposed to inter-species reproduction) in generating the output set 730. In other implementations, inter-species reproduction may be used in addition to or instead of intra-species reproduction to generate the output set 730. Generally, the mutation operation 752 and the crossover operation 754 are selectively performed on models that are more fit (e.g., have higher fitness function values 744, fitness function values 744 that have changed significantly between two or more epochs, or both).

The extinction operation 756 uses a stagnation criterion to determine when a species should be omitted from a population used as the input set 720 for a subsequent epoch of the genetic algorithm 710. Generally, the extinction operation 756 is selectively performed on models that are satisfy a stagnation criteria, such as modes that have low fitness function values 744, fitness function values 744 that have changed little over several epochs, or both.

In accordance with the present disclosure, cooperative execution of the genetic algorithm 710 and the optimization trainer 760 is used to arrive at a solution faster than would occur by using a genetic algorithm 710 alone or an optimization trainer 760 alone. Additionally, in some implementations, the genetic algorithm 710 and the optimization trainer 760 evaluate fitness using different data sets, with different measures of fitness, or both, which can improve fidelity of operation of the final model. To facilitate cooperative execution, a model (referred to herein as a trainable model 732 in FIG. 7) is occasionally sent from the genetic algorithm 710 to the optimization trainer 760 for training. In a particular implementation, the trainable model 732 is based on crossing over and/or mutating the fittest models (based on the fitness evaluation 740) of the input set 720. In such implementations, the trainable model 732 is not merely a selected model of the input set 720; rather, the trainable model 732 represents a potential advancement with respect to the fittest models of the input set 720.

The optimization trainer 760 uses a second portion 706 of the input data 702 to train the connection weights and biases of the trainable model 732, thereby generating a trained model 762. The optimization trainer 760 does not modify the architecture of the trainable model 732.

During optimization, the optimization trainer 760 provides a second portion 706 of the input data 702 to the trainable model 732 to generate output data. The optimization trainer 760 performs a second fitness evaluation 770 by comparing the data input to the trainable model 732 to the output data from the trainable model 732 to determine a second fitness function value 774 based on a second fitness function 772. The second fitness function 772 is the same as the first fitness function 742 in some implementations and is different from the first fitness function 742 in other implementations. In some implementations, the optimization trainer 760 or a portion thereof is executed on a different device, processor, core, and/or thread than the genetic algorithm 710. In such implementations, the genetic algorithm 710 can continue executing additional epoch(s) while the connection weights of the trainable model 732 are being trained by the optimization trainer 760. When training is complete, the trained model 762 is input back into (a subsequent epoch of) the genetic algorithm 710, so that the positively reinforced "genetic traits" of the trained model 762 are available to be inherited by other models in the genetic algorithm 710.

In implementations in which the genetic algorithm 710 employs speciation, a species ID of each of the models may be set to a value corresponding to the species that the model has been clustered into. A species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 710 may maintain a data structure that tracks the fitness of each species across multiple epochs. Based on the species fitness, the genetic algorithm 710 may identify the "fittest" species, which may also be referred to as "elite species." Different numbers of elite species may be identified in different embodiments.

In a particular aspect, the genetic algorithm 710 uses species fitness to determine if a species has become stagnant and is therefore to become extinct. As an illustrative non-limiting example, the stagnation criterion of the extinction operation 756 may indicate that a species has become stagnant if the fitness of that species remains within a particular range (e.g., +/−5%) for a particular number (e.g., 5) of epochs. If a species satisfies a stagnation criterion, the species and all underlying models may be removed from subsequent epochs of the genetic algorithm 710.

In some implementations, the fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

The output set 730 of the epoch is generated based on the input set 720 and the evolutionary operation 750. In the illustrated example, the output set 730 includes the same number of models as the input set 720. In some implementations, the output set 730 includes each of the "overall elite" models and each of the "elite member" models. Propagating the "overall elite" and "elite member" models to the next epoch may preserve the "genetic traits" resulted in caused such models being assigned high fitness values.

The rest of the output set 730 may be filled out by random reproduction using the crossover operation 754 and/or the mutation operation 752. After the output set 730 is generated, the output set 730 may be provided as the input set 720 for the next epoch of the genetic algorithm 710.

After one or more epochs of the genetic algorithm 710 and one or more rounds of optimization by the optimization trainer 760, the system 700 selects a particular model or a set of model as the final model. For example, the final model may be selected based on the fitness function values 744, 774. For example, a model or set of models having the highest fitness function value 744 or 774 may be selected as the final model. When multiple models are selected (e.g., an entire species is selected), an ensembler can be generated (e.g., based on heuristic rules or using the genetic algorithm 710) to aggregate the multiple models. In some implementations, the final model can be provided to the optimization trainer 760 for one or more rounds of optimization after the final model is selected. Subsequently, the final model can be output for use with respect to other data (e.g., real-time data).

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as, but not limited to, C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may take the form of or include a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the actions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. An autonomous underwater device comprising
one or more receiver arrays, each receiver array comprising a plurality of receiver elements, each receiver element configured to generate a signal responsive to detecting sound energy in an aquatic environment;
an on-board navigation control system coupled to a propulsion system and configured to send navigation control signals to the propulsion system to move the autonomous underwater device based on swarm operation data to cause the autonomous underwater device to follow a course that limits sonar system interference between devices of a swarm of devices; and
one or more processors coupled to the one or more receiver arrays and configured to receive signals from the receiver elements, to generate input data based on the received signals, and to provide the input data to an on-board machine learning model to generate model output data, wherein the model output data includes sonar image data based on the sound energy, a label associated with the sonar image data, or both.

2. The autonomous underwater device of claim 1, further comprising:
the propulsion system configured to propel the autonomous underwater device within the aquatic environment; and
wherein the navigation control signals are further based on synthetic aperture sonar settings data.

3. The autonomous underwater device of claim 2, wherein the one or more processors are configured to generate the synthetic aperture sonar settings data based on second model output of a second on-board machine learning model.

4. The autonomous underwater device of claim 2, wherein the synthetic aperture sonar settings data indicate a ping encoding scheme, a ping wavelength, a ping duration, a ping amplitude, a ping interval, ping timing, a navigation course, an along course speed, or a combination thereof.

5. The autonomous underwater device of claim 2, wherein the navigation control signals are further based on swarm operation data indicating a position or operation of the autonomous underwater device in the swarm of devices.

6. The autonomous underwater device of claim 5, wherein the course is selected to be non-parallel to courses of one or more other devices of the swarm of devices.

7. The autonomous underwater device of claim 1, further comprising a communications system configured to receive a communication signal from another device, and wherein the input data is further based on the communication signal.

8. The autonomous underwater device of claim 7, further comprising one or more sonar transducers configured to emit sound energy into the aquatic environment via one or more pings, wherein the communication signal includes calibration data indicating measurements of sound energy at the other device responsive to emission of the one or more pings by the one or more sonar transducers.

9. The autonomous underwater device of claim 7, wherein the communication signal includes second sonar image data generated by the other device, and wherein the model output data is based on multiple sonar images from multiple devices.

10. The autonomous underwater device of claim 1, further comprising one or more sonar transducers configured to emit one or more pings, wherein at least a portion of the sound energy detected by the one or more receiver arrays is derived from the one or more pings.

11. The autonomous underwater device of claim 1, wherein the one or more processors are configured to generate, based on the received signals, a plurality of sonar images using two or more distinct sonar image processing techniques, and wherein the on-board machine learning model includes an image generation model trained to generate the sonar image data based on the plurality of sonar images generated using the two or more distinct sonar image processing techniques.

12. The autonomous underwater device of claim 1, further comprising a notification system configured to generate an alert responsive to detection, in the sonar image data, of a particular type of object.

13. A system comprising:
a plurality of autonomous underwater devices configured to operate cooperatively as a swarm, the plurality of autonomous underwater devices comprising:
a first autonomous underwater device comprising:
a propulsion system configured to propel the first autonomous underwater device within an aquatic environment;
an on-board navigation control system coupled to the propulsion system and configured to send navigation control signals to the propulsion system to move the first autonomous underwater device based on swarm operation data to cause the first autonomous underwater device to follow a course that limits sonar system interference between devices of the swarm;
one or more receiver arrays, each receiver array comprising a plurality of receiver elements, each receiver element configured to generate a signal responsive to detecting sound energy in the aquatic environment; and
one or more processors coupled to the one or more receiver arrays and configured to receive signals from the receiver elements, to generate input data based on the received signals, and to provide the input data to a machine learning model associated with the swarm to generate model output data, wherein the model output data includes sonar image data based on the sound energy, a label associated with the sonar image data, or both; and
a second autonomous underwater device comprising one or more sonar transducers configured to emit one or more pings into the aquatic environment.

14. The system of claim 13, wherein the swarm further comprises at least one stationary device configured to facilitate navigation, communications, or both, among the plurality of autonomous underwater devices of the swarm.

15. The system of claim 13, wherein the one or more receiver arrays of the first autonomous underwater device are configured to detect the one or more pings emitted by the one or more sonar transducers of the second autonomous underwater device.

16. The system of claim 13, wherein the first autonomous underwater device further comprises a first synthetic aperture sonar system that includes the one or more receiver arrays, the one or more processors, and at least one sonar transducer, wherein the second autonomous underwater device further comprises a second synthetic aperture sonar system that includes the one or more sonar transducers, at least one receiver array, and at least one processor, and wherein the first synthetic aperture sonar system and the second synthetic aperture sonar system are configured to operate cooperatively to generate the sonar image data.

17. The system of claim 16, wherein the machine learning model associated with the swarm comprises an on-board machine learning model of the first synthetic aperture sonar system and wherein the input data to the on-board machine learning model of the first synthetic aperture sonar system is further based on communication signals received from the second autonomous underwater device.

18. The system of claim 13, wherein the one or more processors of the first autonomous underwater device are further configured to generate synthetic aperture sonar settings data based on second model output of a second on-board machine learning model.

19. The system of claim 13, wherein the first autonomous underwater device further comprises a communications system configured to transmit, to the second autonomous underwater device, a communication signal including calibration data based on measurements of sound energy of one or more pings detected at the one or more receiver arrays of the first autonomous underwater device.

20. The system of claim 13, wherein the first autonomous underwater device further comprises a notification system configured to generate an alert responsive to detection, in the sonar image data, of a particular type of object.

21. The system of claim 13, wherein the navigation control signals are further based on synthetic aperture sonar settings data.

22. A method comprising:
emitting, from a first autonomous underwater device, sound energy in an aquatic environment via one or more pings;
receiving, at the first autonomous underwater device from a second autonomous underwater device, an electromagnetic waveform encoding a communication signal;
based on the communication signal, determining synthetic aperture sonar settings data to limit interferences between synthetic aperture sonar systems of devices of a swarm of autonomous underwater devices;
detecting, at the first autonomous underwater device, sonar returns based on the one or more pings;
generating input data based on the sonar returns and the communication signal; and
providing the input data to a machine learning model on-board the first autonomous underwater device to generate model output data, wherein the model output data includes sonar image data based on the sonar returns, a label associated with the sonar image data, or both.

23. The method of claim 22, further comprising processing the sonar returns based on the synthetic aperture sonar settings data to generate the input data.

24. The method of claim 22, wherein the one or more pings include at least a first ping and a second ping, wherein the communication signal is received responsive to the first ping, and further comprising setting parameters of the second ping responsive to the communication signal, wherein the sonar returns are based on the second ping.

25. The method of claim 22, wherein the communication signal include second sonar image data, and further comprising determining first sonar image data based on the sonar returns, and wherein the sonar image data of the model output data is based on the first sonar image data and the second sonar image data.

26. The method of claim 22, further comprising sending the sonar image data, the label, or both, to another autonomous underwater device of the swarm of autonomous underwater devices, the swarm of autonomous underwater devices including the first autonomous underwater device and the second autonomous underwater device.

27. A method comprising:
obtaining position data indicating locations of one or more underwater devices of a swarm of devices in an aquatic environment;
determining navigation data for at least one device of the swarm of devices based on output of a tactical machine learning model that is trained to predict adversarial actions during an engagement between an adversarial agent and one or more friendly agents, to select responses to detected adversarial actions, or both; and
sending the navigation data to a navigation control system onboard the at least one device to cause the at least one device to, in cooperation with one or more other devices of the swarm of devices, gather synthetic aperture sonar data in a particular area by selecting one or more synthetic aperture sonar settings to limit interferences between synthetic aperture sonar systems of devices of the swarm of devices.

28. The method of claim 27, wherein the one or more synthetic aperture sonar settings includes a ping encoding scheme, a ping wavelength, a ping duration, a ping amplitude, a ping interval, ping timing, a navigation course, an along course speed, or a combination thereof.

29. The method of claim 27, wherein the navigation data is determined at one or more processors onboard a first autonomous underwater device, and wherein the navigation data is sent to a navigation control system onboard the first autonomous underwater device, wherein the navigation control system onboard the first autonomous underwater device is configured to send navigation control signals to a propulsion system of the first autonomous underwater device to cause the first autonomous underwater device to move to the particular area.

* * * * *